(12) United States Patent
Molinaroli

(10) Patent No.: US 6,265,984 B1
(45) Date of Patent: Jul. 24, 2001

(54) LIGHT EMITTING DIODE DISPLAY DEVICE

(76) Inventor: Carl Joseph Molinaroli, 925 Corlis Dr., Mt. Pleasant, SC (US) 29414

( * ) Notice: Subject to any disclaimer, the term of this patent is extended or adjusted under 35 U.S.C. 154(b) by 0 days.

(21) Appl. No.: 09/370,728

(22) Filed: Aug. 9, 1999

(51) Int. Cl.[7] .................................................. G08B 5/00
(52) U.S. Cl. ............................... 340/815.4; 340/815.45; 340/815.53; 345/31
(58) Field of Search ................................ 340/815.4, 702, 340/755, 815.45, 815.53; 345/31, 84; 359/464; 36/137; 362/240, 72

(56) References Cited

U.S. PATENT DOCUMENTS

| | | | |
|---|---|---|---|
| 4,271,408 | * 6/1981 | Teshima et al. | 340/702 |
| 4,311,999 | * 1/1982 | Upton et al. | 340/755 |
| 5,406,300 | * 4/1995 | Tokimoto et al. | 345/31 |
| 5,457,900 | * 10/1995 | Roy | 36/137 |
| 5,670,971 | * 9/1997 | Tokimoto et al. | 345/31 |
| 5,748,157 | * 5/1998 | Eason | 345/31 |
| 5,757,546 | * 5/1998 | Lipton et al. | 359/464 |
| 5,765,940 | * 6/1998 | Levy et al. | 362/240 |
| 5,793,343 | * 8/1998 | Hart et al. | 345/84 |
| 5,800,039 | * 9/1998 | Lee | 362/72 |
| 5,903,224 | * 5/1998 | Reynolds | 340/815.45 |
| 5,973,607 | * 10/1999 | Munyon | 340/815.4 |
| 6,037,876 | * 3/2000 | Crouch | 340/815.53 |

* cited by examiner

*Primary Examiner*—Jeffery Hofsass
*Assistant Examiner*—Phung Nguyen
(74) *Attorney, Agent, or Firm*—Harleston Law Firm; Kathleen M. Harleston

(57) ABSTRACT

A pre-programmed device and method for forming and displaying images includes: electrically powered light emitters in one or more rows that can be moved in a path generally perpendicular with the row of lights; a microprocessor(s) controlling the lights; motion or speed sensors which enable the display device; and a source of electrical power within, on, or connected to the display device is provided. The microprocessor turns the individual electrically powered light emitters on and off in a time-controlled manner to display graphics, words or messages when the display device is moved at or above a rate of speed required to be seen by humans.

39 Claims, 13 Drawing Sheets

LIGHT EMITTING DIODE DISPLAY DEVICE

BACKGROUND OF THE INVENTION

1. Technical Field

The present invention is a pre-programmed device and method for forming and displaying images, comprising electrically powered light emitters, preferably light emitting diodes, in one or more generally continuous rows, which are under the direct control of a microprocessor(s), such that graphics, text, or other images are displayed when the display device is moved at or above a rate of speed sufficient to be viewed by humans.

2. Background Information

There have been devices developed in the past that use multiple lights which are moved to give the illusion of shapes, but no pre-programmed, electrically powered device having light emitters under the direct control of a microprocessor has heretofore been available. The display device of the present invention preferably includes a non-reflective, tinted cover with spectral light filters to allow day light viewing of displayed images.

Even though this display device emits light from individual lights or LEDs, the human eye perceives it as a continuous word or picture message. Light pulses at a constant speed, but the pulse rate of most light is above our ability to perceive individual pulses. We perceive daylight, for example, to be constant, when sunlight actually arrives at the eye in short bursts. Sound is similar; humans perceive certain sounds as continuous when actually the stream of sound is in pulses. Humans have a different persistence of vision than other animals. The devices of the present invention give a human observer the illusion of a continuous light display by turning lights on and off with the display device in different locations.

The display device of the present invention is a modular device comprising one or more microprocessors, preferably on one or more printed circuit (PC) boards, directly controlling one or more rows of lights, preferably a plurality of light emitting diodes (LEDs). The microprocessor turns on and off the individual LEDs to allow a main PC board, when moved, to give the illusion of alpha-numeric characters, and/or two- and three-dimensional (2-D, 3-D) shapes. The main PC board can be independently operated once it is fitted with a power source, preferably batteries, and motion or speed sensors. With this invention, a powerful, fun, inexpensive, versatile light display for producing images is provided to the average consumer, in contrast with conventional light emitting diode displays currently on the market.

BRIEF SUMMARY OF THE INVENTION

The present invention is a pre-programmed device for displaying images, comprising:

(a) a plurality of electrically powered light emitters in one or more generally continuous rows, the display device being capable of being moved in a path generally perpendicular with the row of lights, (b) one or more microprocessors, the light emitters being under direct control of one or more microprocessors;

(c) one or more motion or speed sensors within the display device; and (d) a source of electrical power within, on, or connected to the display device; and wherein one or more sensors enable the microprocessor; and the microprocessor turns individual light emitters on and off in a time-controlled manner, in order that graphics, words or messages are displayed when the display device is moved at or above a rate of speed sufficient for human persistence of vision.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
FIG. 1 shows a perspective view of a policeman holding a traffic light baton display device according to the present invention.

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, the invention will now be described.

Figure 2:
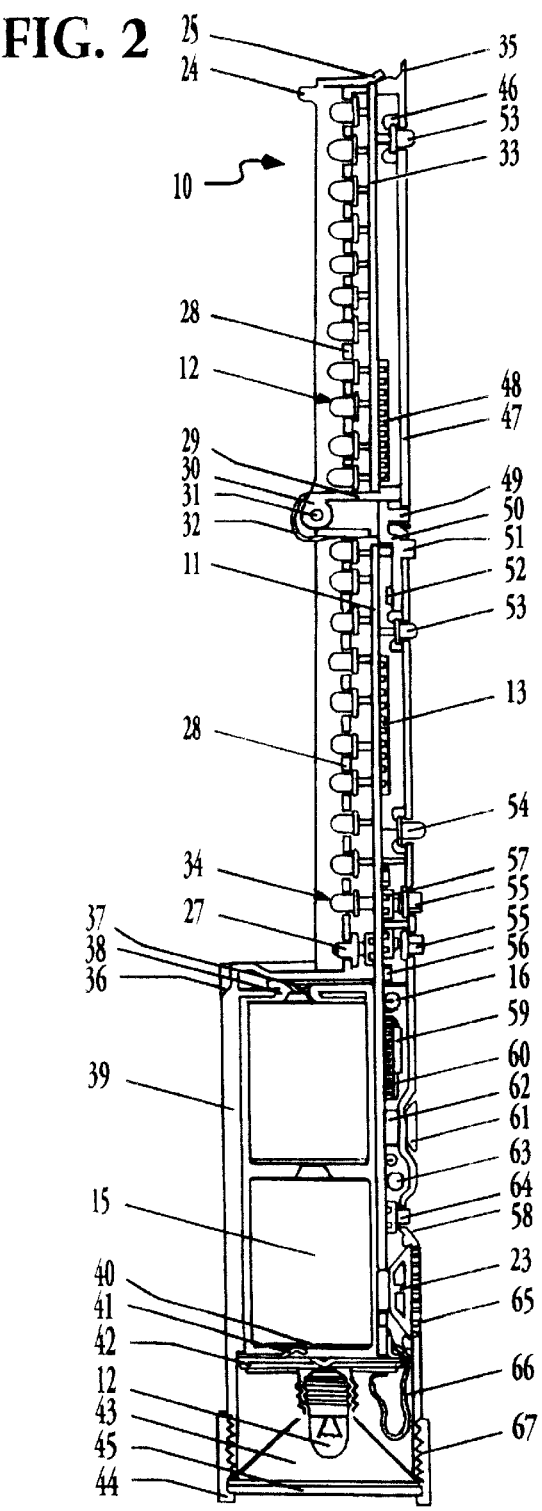
FIG. 2 is a side elevation view of the traffic light baton display device of FIG. 1, in an open position and without an outer covering.
Figure 3:
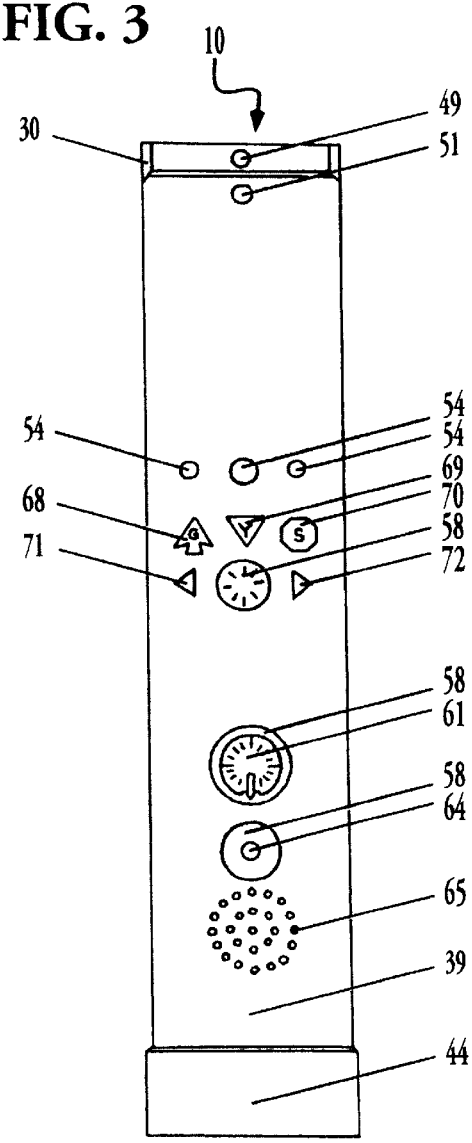
FIG. 3 is a front elevation view of the traffic light baton display device of FIG. 1, in a closed position.
Figure 5:
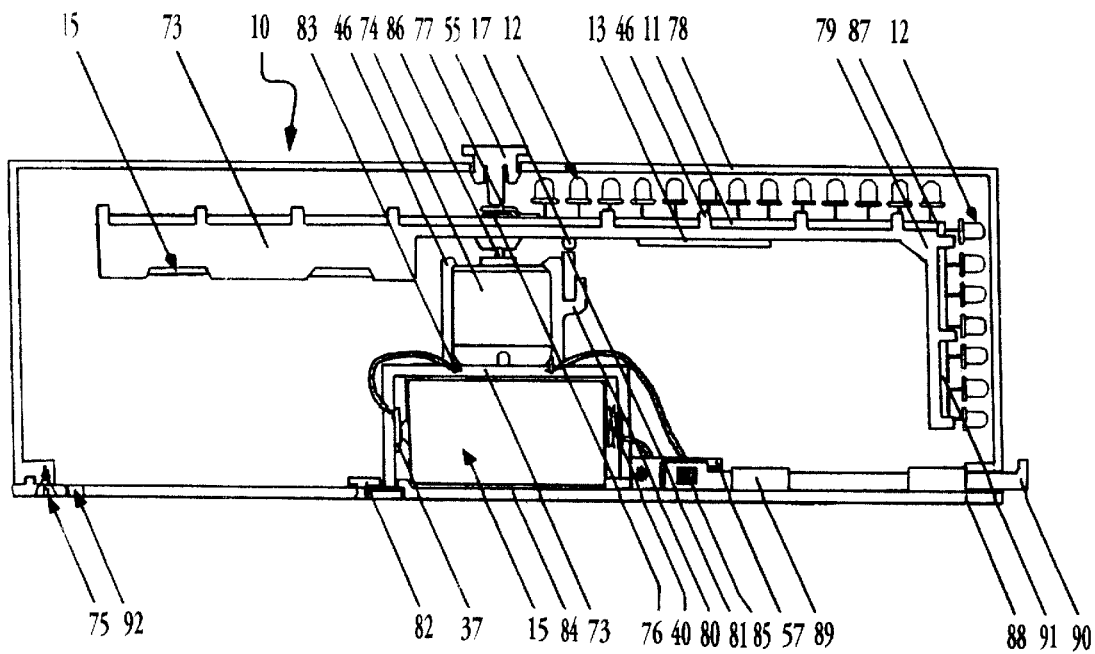
FIG. 5 is a side elevation view of the circular ceiling-mounted display device of FIG. 4, with a clear outer covering.

As shown in FIGS. 1–3, this is a pre-programmed device 10 comprising a display PC board 11 and optional additional PC boards. The display PC board 11 comprises a plurality of lights, preferably a plurality of light emitting diodes (LEDs) 12 in rows, under the direct control of a microprocessor 13. By "PC board" is meant printed circuit board, and by "LED" is meant light emitting diode. The microprocessor 13 turns on and off the individual LEDs 12 to allow the display PC board 11, when moved, to give the illusion of alpha-numeric characters, and/or two- or three-dimensional (2-D, 3-D) shapes. The display PC board 11 is fitted with an internal or external power source for independent operation, and a device for timing so that the position of the display device can be determined during use. The timing device is unnecessary if the display is moving at a constant known speed, or if the display speed is controlled by the display microprocessor or other control circuit. Preferably, battery terminals 14 connect the display PC board to one or more batteries 15. Sensors such as centrifugal switches 16 (as shown in FIG. 2), reed switches 17 (shown in FIG. 5), and photosensors 18 (shown in FIG. 17), enable the microprocessor 13 to establish the direction of movement and thereby enable proper display and timing. The device 10 must be moved by some means. This may be an outside (external) source of motion such as a car or the user's hand, or it may be a source of motion within the device itself (internal), such as a motor. A motor may drive the display directly with a rotating motor shaft 19, for example as shown in FIG. 5, or indirectly, for example, with a reduction system. When a rotating motor shaft is employed, the display PC board 11 can be mounted to a display arm 20 or arms attached to the rotating motor shaft 19 as shown in FIG. 5. The motion may be a continuous forward motion, or it may be a swinging, circular, or pendulum motion.

Various support items can be added, such as a translucent (e.g., tinted) or opaque cover 21 to allow good visibility during daylight, as shown in FIG. 5. Extended memory, such as EEPROM 22 (see FIG. 18), EPROM, or PROM, is preferably included in the present device to allow extended messages and user programming of the display. If support devices, such as speakers 23 and amplifiers 24 as shown in FIG. 2, are installed, the present device can emit sounds, words and songs. As illustrated by FIG. 2, multicolor LEDs 12 are preferred to allow more colorful displays. With hardware added on the display PC board 11, and external hardware and electronics, games can also be played on a device according to the present invention.

A preferred microprocessor for the various embodiments describe herein is a peripheral interface controller (PIC) microprocessor, which a) a built-in oscillator to avoid an external oscillating circuit, b) a built-in delay startup circuit to eliminate an external start-up circuit and allow for smooth, reliable start-up, c) TTL rated (25 milliamps per pin) outputs by the microprocessor to allow the LEDs 12 and lamps to be driven directly, eliminating the need for a driver circuit in most cases, d) a low current sleep mode, which is the microprocessor fully shut down except for an internal portion necessary for monitoring specific input pins for the change of state to wake up the microprocessor, and e) optional built-in memory, such as EEPROM 22, which can retain user programmed information even without a battery 15. In the low current sleep mode, the microprocessor only draws about 1–3 microamps of current. If higher current is needed to drive the lamps during operation, high current drivers are easily included in the design of the circuit between the microprocessor I/O (input/output) pins, and the lamps. In the present invention, the microprocessor turns the LEDs or lamps in the device on and off for short bursts. This eliminates the need for resistors in the circuit that would ordinarily control current. This is beneficial in that it allows for real-estate (PC board) savings, and reduced assembly time and parts cost (because fewer parts are necessary). The preferred microprocessor will also contain internal pull-up resistors to keep a positive bias on inputs (e.g., tilt switches) to eliminate external resistors.

The backbone of the present device 10 is the display PC board 11, which holds the components. A centrifugal switch 16 is preferably mounted on the PC board 11. In use, the operator preferably moves the device with the LEDs back and forth. This movement opens and closes contacts within the device. In the present invention, the centrifugal switch 16 serves two purposes: to wake up the microprocessor even in the absence of an on-off switch, and to control timing. There is thus no need for an on-off switch. The microprocessor 13 awakening from sleep mode acts as an on-off switch and the microprocessor algorithm controls the display timing to appear in the same location and with the same message length each time the device is moved back and forth. In user-programmable embodiments of the present device, this also permits messages to be stored in RAM because no power is removed when the microprocessor is in sleep mode. This is advantageous in that it eliminates the need for a EEPROM chip or battery-backed RAM, or other types of memory storage devices.

Various embodiments of display devices according to the present invention are described below.

FIGS. 1–3 Police Traffic Baton Display Device

A first embodiment of the present invention is shown in FIGS. 1–3: a traffic baton display device and light. This display device is designed to operate at night as shown in FIG. 1, when traffic signals fail or when traffic control by a policeman or other authorized person is necessary. It can be used in the same way that a policeman or policewoman directing traffic currently uses a flashlight, but it is more effective and allows better communication with drivers and a higher modicum of safety than a flashlight.

Like all of the embodiments described herein, the traffic light baton display device comprises: a display comprising a plurality of lights (here, LEDs), at least one PC board (here, two) controlling the LEDs, a power source (here, batteries) for supplying power, and at least one microprocessor (here, two) for controlling the PC board. As shown in FIG. 2, the device 10 shown includes a snap lock mechanism 25 so that the display top fits snugly when the baton device is folded for carrying or storage. When the top section of the display is folded, a push-button extension tab 26 (opening/closing tab) pushes in momentary push button 27 to disable the operators push buttons on the display. The device also includes: a baton cover 28 to align LEDs and protect PC boards; upper LEDs 12 on the top display section; a top wall 29 which covers and protects the top of the display when the display is folded together; a bearing section 30 of the display hinge; a hinge having a pin section 31 inserted into the bearing hole 30; jumpers 32 to electrically connect a secondary display 33 (top) PC board to a main 11 (bottom) PC display board; a wall to protect the top of the main (bottom) display section 11 when closed; bottom LEDs 34 in the main (bottom) display section 11; a second component of the snap lock mechanism 25; a lifting tab 35 and an opening slot 36 to allow the operator to use a fingernail to open (unfold) the display device; a positive battery terminal 37 made of conductive spring metal; and a positive battery terminal hole 38. The positive battery terminal hole 38 is only large enough to fit the batteries positive protruding terminal to eliminate the need for a rectifying diode to protect the electronic circuit. Section 39, which consists of the bottom ½ of the display and the base section.

As is also shown in FIG. 2, as a cross sectional view in the operating position the traffic light display device further includes the following: a battery(ies) 15 to a light and display(s) circuit; a negative battery terminal 40; properly formed conductive spring metal 41, that conducts electricity from the negative battery terminal 40 to the light bulb end tip terminal and main display circuit board; a plastic disk 42, that insulates between conductive metal bulb holder and the negative power terminal 40. The device shown in FIGS. 1–3 further includes: a light reflector 43 that is attached to a flash light focus adjustment ring 44, which changes the focus of a light beam when it is turned by moving the reflector 43 and a flash light lens 45 in and out.

As can be seen in FIG. 2 as a cross sectional view in the operating position and 3, in an outside view in the collapsed position the baton display device includes: plastic snaps 46 for quick and secure attachment of the PC boards LEDs, speakers, etc. to the display; a top outer case 47; a second microprocessor 48 that supports the top display PC board; a locking tab 49 to keep the display locked in the open position; a flexible arm 50, which the locking tab 49 is part of or attached to, a release push button 51 which is also attached to the flexible arm 50 and which, when depressed, releases locking tab 49 (catch) to allow the operator to close (fold) the display device; a point of attachment 52 of the flexible arm 50 to the display base; rear view LEDs 53 to assure the operator that the base and top portion of the display are operating properly; and a main microprocessor 13 which also controls the second (top section) microprocessor 48. It is possible to use a serial data IC chip(s), shift registers, multiplexer, etc., in place of second microprocessor 48.

The baton display device also comprises: mode display LEDs 54 that light in different colors to represent which push button 55 is depressed allowing the operator to see what is being displayed; a colored, flush-mounted LEDs 56 and others not shown but associated to each push button to illuminate a translucent or transparent push button 55 which, when pushed, presses a corresponding switch 57, which inputs to the microprocessor. A depression 58 (external view) used to help the operator know the location of push buttons, centrifugal switch 16, which is directional and activated when the display device is swung back and forth; solid state switch 59 or relay to turn on (enable) power to the flash light bulb when it is enabled; sound chip 60, which is used to give the operator audio commands; sound (audio) level control knob 61, which is connected to potentiometer 62; support components 63 for the sound chip; a light power switch 64, which is used to turn on the flash light, and which feeds input to the microprocessor in order to control the light; and a second depression 58 around the light power switch 64 protects the light from accidentally being turned on (see 58). These are shown in FIGS. 2 and 3. The light can be enabled when the display device is closed, or folded.

Centrifugal switches can be employed in various embodiments herein. As used herein the term "centrifugal switch" means a switch which can move in one or more directions. It is preferably a metal ball enclosed in a metallic tube with opposite closed ends. The metallic tube has a conductor attached for use as a common in the circuit. At one or both ends of the metallic tube is an insulated contact, with an insulated conductor leading away from the tube. The contact and conductor may be at one or both ends of the metallic tube. Between each contact and the ball is a spring. When the device is moved back and forth with enough force, the ball moves back and forth in the tube. The ball hits the spring and compresses it, then impacts the contact. This closes the circuit and inputs to the microprocessor.

Continuing with FIG. 2, the baton display device further comprises: holes 65 to allow emission of audio sounds from a speaker 23; wires 66, from PC board circuit which are soldered to light base holder to give the light power; threads 67 to allow focus adjustment (see 43); and different color LEDs 54 (green, yellow or red), which are used to indicate go, yield, or stop when the proper button is depressed. Buttons on the face of the device, which can be pressed by the operator, are shown in FIG. 3. "Go" push button 68, "Yield" push button 69 (preferably transparent and shaped like a yield sign), "Stop" push button 70 (preferably transparent and shaped like a stop sign) and, Arrow keys 71 and 72 control left and right signals, respectively. A depression 58 keeps the operator oriented with push buttons. A third depression 58 keeps operator from unintentionally adjusting volume knob 61 while in operation.

In use, the operator enables a traffic light baton display device as shown in FIG. 1 by opening or unfolding the top section 47 of the device 10. By selecting and pressing a command button, 68, 69, 70 which are shown in FIG. 3, the operator can display messages such as "Stop" in the color red, "Go" in the color green, and "Yield" in the color yellow. The operator may also press one of the arrow keys 71, 72 to indicate the direction in which the vehicles being directed should turn. By using a voice chip 60 or audio output programmed into the microprocessor 13, the operator can hear the displayed words (function) with the built-in speaker 23 to confirm that they have selected the proper display buttons 68, 69, 70, 71, 72. The volume controller 61 is adjustable to accommodate for noisy conditions. Each push button 68, 69, 70, 71, 72 is lit in a color and has a shape to correlate with the function being displayed. LEDs 53 on the back of the display allow drivers to see the operator from the back for safety reasons. At the end of the baton display, there is a built-in, focusable flashlight 12. The flashlight is turned on with a recessed push button 64 which is under the control of the microprocessor 13. This enables the flashlight to automatically shut off on timed delay in order to keep the batteries 15 from accidentally being used up, and to turn off the flashlight when the display is in use.

Figure 4:
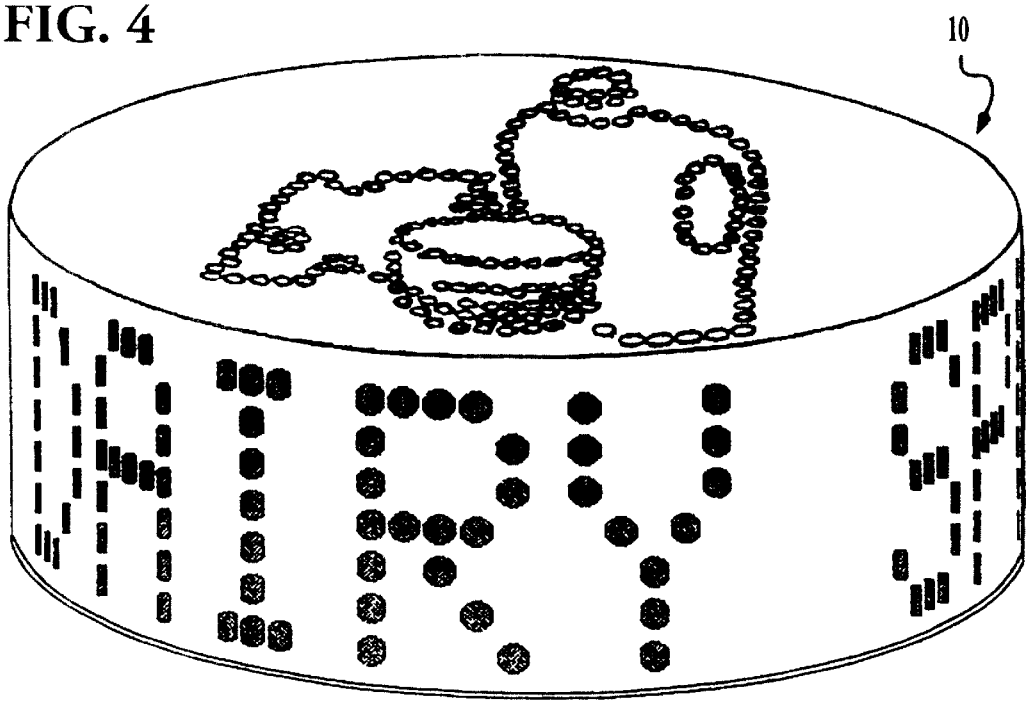
FIG. 4 is a perspective view of a second embodiment: a circular ceiling-mounted display device according to the present invention.

FIGS. 4, 5 Display on a Single Rotating Axis

FIGS. 4 and 5 detail a second embodiment of the present invention: a circular, display device suitable for use in a grocery store, restaurant, high schools, road side signs, automobile inside windows, cafeterias, part of a lampshade, etc. Spinning lights turned on and off in sequence give an optical illusion to observers of pre-programmed symbols. Symbols may include logos, school mascots symbols and slogans, catch phrases, song lyrics, etc. This device is preferably circular and is most preferably between about 12 and 24 inches in diameter but could be much larger or smaller. It is designed for commercial or private use.

This device is preferably placed on a flat surface, such as a desk, store shelf or inverted and permanently mounted on a ceiling or wall, most preferably the ceiling inside a grocery store or restaurant and could include a hidden camera. It could be hung on a pole or arm projecting from a ceiling or wall. It allows viewing from all angles. It can alternatively be temporarily mounted on the roof of a vehicle, preferably using magnet(s).

As shown in FIG. 5, with the housing and base made in clear or tinted plastic, a horizontal display PC board is attached and parallel to the top of the display arm. Alternatively, the horizontal display PC board can be directly attached to the motor shaft. The display arm is attached to a motor shaft. A vertical display PC board is preferably attached to an end of the horizontal display PC board at its upper end. The incorporation of the arm into the design of the present device allows for either horizontally or vertically positioned PC boards, or both.

Preferably, LEDs are mounted in series on the PC boards. Single or multi-colored lights may be used. The firing of the different lights can be programmed to produce color symbols and figures containing many different colors. Lasers or other types of focusable light sources can be used to project light onto external surfaces in this invention.

The device is under the direct control of a microprocessor. The display preferably has two lighted surfaces, one vertical and one horizontal, curves could be accomplished by using flex PC boards, direct wiring of lights, very thin boards bent on frame work or PC boards mounted at an angle with lights installed. The lights are spun by a motor mounted on the base of the device. AC synchronous-type motors are preferred, these motors will stay at a constant RPM and can be direct-driven by a standard household AC current. Suitable motors may include standard DC motors, induction-style motors, stepper motors with drivers and magnetic none contact levitation systems.

Higher end models could be user programmed to display text and moving or stationary images. User programming functions may include remote infrared, RF remote, pager interface, cellular, ultrasonic, on-unit programming buttons, and combinations thereof. The present devices can be interfaced using computers or telephones. Telephone interfacing can employ dual tone multi frequencies. Computer interfacing can include RS 232, RS 422, RS 485, parallel port, ethernet, USB, RF, ultrasonic, or IR, through the Internet, or a combination of these.

To power this device, on-board replaceable or rechargeable batteries can be used on lower end models. On those devices which are expected to be in constant use such as commercial devices, electromagnetically induced power through the use of energized, electrically wound coils or permanent magnets can be used to induce power to circuit board-mounted electromagnetic coil which is parallel to, or encased in, the electrically wound coil. These devices can be run without the necessity of replacing batteries on the display circuit.

An alternative power source for the display circuit is generator-driven. The generator is mounted on the display board and is centered in a line with the driver motor shaft. When the display arm is driven, the body of the generator motor spins. The generator motor shaft is attached to the display cover, and the display cover is attached to the display base, so the generator motor shaft and the display cover cannot spin.

On higher end commercial models, this display should typically last for several years if it is run continuously, and for many years if it is run during a typical eight hour day, depending upon the type of motor that is used. The same display device could be made portable by removing the base and top on a battery-operated, horizontal-type display device. The display portion or the motor portion of the device could be hinged to allow the device to be folded back into the main body, creating a more portable or storable device. Thus, a single unit could be hand-held, and in other models LED arm could be popped off and attached to the main body for portability, a stand for desk-top or wall mounting could also be included. With a more powerful microprocessor and operating system, and very small LEDs, voice or photo sensor input, RF TV tuner, this would allow for a fully functional pen size computer or TV.

As seen in FIG. 5, this circular, mountable display device comprises the following: batteries 15 in a battery holder 73; an electrical motor 74 that rotates a display portion of the device; a screw 75 used to secure the top of the display to the base; a copper pad 76 on the PC board that is directly connected to an input pin on the microprocessor; copper or spring conductive metal 77 (a momentary contact switch could be used), which, when pushed down to touch the copper pad 76, pulls input to an opposite state, allowing user programming; an external push button 55 that forces contact of the metal contacts (see 76 and 77); a horizontal PC board 11; LEDs 12; a translucent case cover 78; a microprocessor 13 that controls the display PC board; a structural arm 79 used to support the display PC board; PC board, snap-type mounting clips 46, which are molded into the PC board structural support.

The circular display device further includes: a magnet holder 80 and a magnet 81 molded next to the motor 74 and positioned to activate a reed switch 17; the reed switch 17, which is used to wake the microprocessor and tell the microprocessor arm location in order to control display timing. This reed switch 17 is not necessary on models of display using an inductive reactance coil for power and position sensing. This display device further includes a positive battery terminal 37 with a strip slot design to only allow the protruding positive terminal of the battery to make contact. This allows the elimination of a rectifying diode and also ensures proper direction of motor rotation. Also shown in FIG. 5 are: a battery door lock tab 82; a snap-in tab 46 to hold the motor and PC boards in place; a motor power terminal 83; another battery 15 for the motor; a battery door 84; a switch 57 that powers the drive motor; a slot in arm 85 to encompass a switch toggle; a negative battery terminal 40 ("Generic"); motor shaft 86; solder traces 87 connected here with solder between PC boards; a base 88 of the display device; a guide 89 used for an arm that turns the power switch off and on; an arm 90 from the outside of the case to a switch inside at the battery holder 73; a vertical display PC board 91, which may contain its own microprocessor; and a position for mounting holes 92. The structural arm 79 is press fitted on to the motor shaft 86.

A very large version of this display could be made which could be used as a road side sign. Many of the same techniques used in the smaller displays would work in the larger display. Strobe lamp preferably would be used to allow easy viewing of lights in day light, colored lens and multi rows of lights could allow different colors to be displayed. For very large displays, multiple display arms may be necessary depending on speed of display arm.

FIGS. 6–9 Hand Held & Key Chain Display Devices

Figure 6:
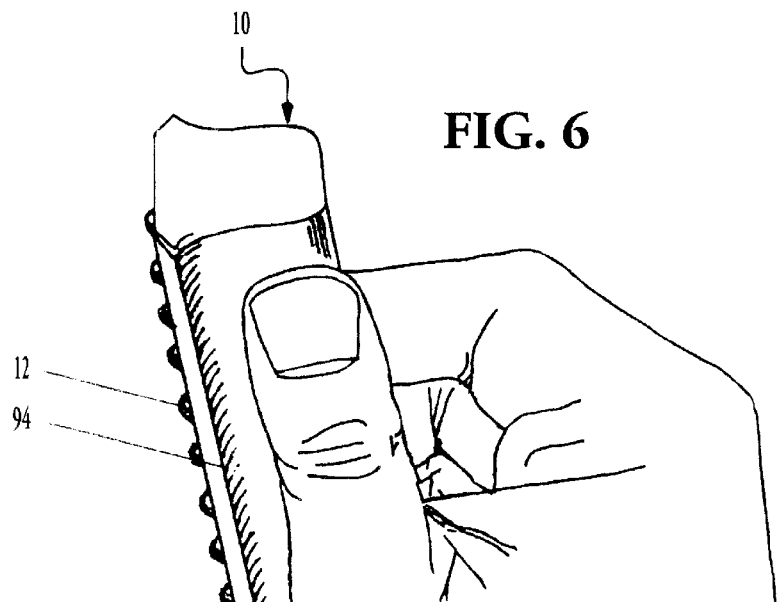
FIG. 6 is a perspective view of a person's hand holding a third embodiment of a display device according to the present invention: a hand-held display device.
Figure 7:
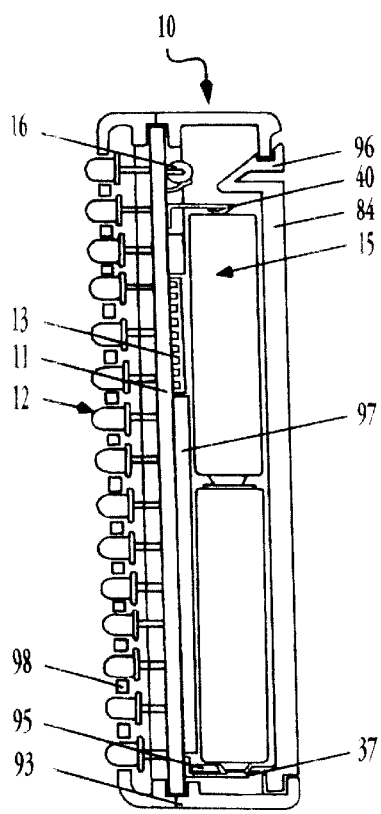
FIG. 7 is a side elevation view of the hand-held display device of FIG. 6, without an outer covering.
Figure 8:
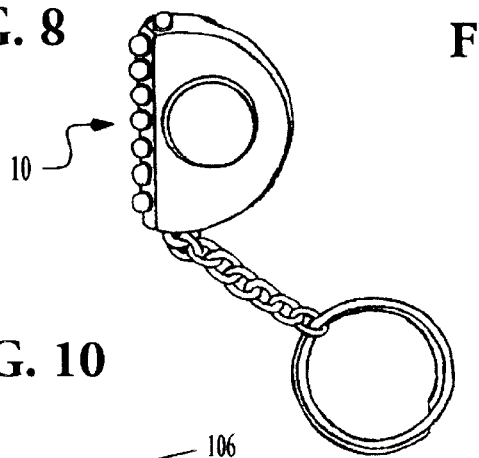
FIG. 8 is a perspective view of a fourth embodiment: a keychain display device according to the present invention.
Figure 9:
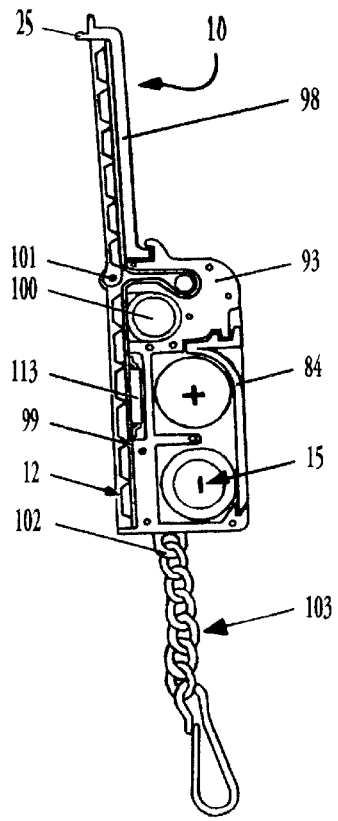
FIG. 9 is a side elevation view of another keychain display device of FIG. 8, in an open position and without an outer covering.

In FIGS. 6–9, several hand-operated display devices of the present invention are shown. It is believed that the ergonomically correct design is to be small as possible for the ease of portability, but shaped for comfort and to keep the operator's fingers from obstructing visibility of the display. The hand operated display device is programmed to display ASCII characters, or symbols, or graphics when the device is moved back and forth, in a circle, or in some other repeated motion by the operator. Thus, only one hand is required to activate the display. With today's smaller and more powerful microprocessor, this device can be easily and inexpensively built small to fit in the hand as shown in FIGS. 6 and 7, or on the end of a key chain as shown in FIGS. 8 and 9.

This embodiment could be used for different purposes. With attachments added by the operator or molded into the outer case, this display device could be strapped to the user's arm or leg for jogging, walking, biking, etc. This device enhances the safety of the jogger, walker or biker by signaling his or her presence on the path or in the roadway, or the device may provide messages of interest/amusement to passers by. This device could be clipped, or attached by hook and loop attachment means, to shoes or clothing, for example. This device may be used, for example, at sporting events or concerts. College students, for example, may want to display their school initials or symbol, like "USC" or a tiger paw at a sporting event or in cars afterward. Children may send messages with these devices, or display the latest novelty characters. The key chain display could be designed to fold in half lengthwise to allow a larger display in a compact body as shown in FIG. 9.

A rod, cable, wire or string could be attached to the device to allow the device to be swung in a circle by the operator as an alternative to the operator swinging his or her arm back and forth. The timing could be constant, or the device's rotations could be sensed at a display-mounted swivel, which would also prevent the string, wire or cable from becoming twisted. The display could be mounted on a flexible or stiff rod with a handle on the other end which could contain the batteries, this type of display could be whipped back and forth, the display could be mounted length ways FIG. 7 shows a preferred embodiment of a third embodiment of the present invention: a hand held display device. The heart of the hand operated display is the microprocessor 13, which controls the LEDs 12 individually or in a combination of pairs, triples, or more to increase the size of the display without operating the display. Battery terminals 37, 40 are permanently mounted to the PC board 11 in the device. The PC board 11 is installed in the main body 93, which has a hand guard or grip 94 along the outside to keep fingers from blocking the display, and grooves 95 at the positive battery end. This only permits the battery(ies) 15 to go in one direction and make contact with the positive battery terminal 37. This eliminates the need for a rectifying diode to protect the display circuit. A voltage regulator circuit and supporting components are not necessary if the type and quantity of batteries are chosen so that the voltage remains in the realm of the processor's operating capabilities. The battery door 84 has a flexible plastic catch 96, which allows ease of installation and removal of batteries without tools. A plastic wall 97 between battery and PC board to protect from each other. The display cover 98 on the main body 93 of the hand operated display serves two purposes: to hold the PC circuit board 11 in place and to protect the LEDs 12. Lasers or focusable light sources could be used to emit light on external surfaces. There are holes in the display cover 98 to allow the LEDs 12 to be seen and to keep alignment. Body parts are designed for ease of assembly and operator usage. Only two-piece molds are required for manufacture of the device, which saves time and over-all cost. The centrifugal switch 16 controls time and wakes microprocessor 13 to start operation when the display is swung back and forth.

The key chain display device shown in FIGS. 8 and 9 is similar to the hand held display device shown in FIGS. 6 and 7 except that the latter is small enough to fit on a key chain. This is a fourth embodiment of the present invention. A cross sectional view of the display device as shown in FIG. 9 folds out to make display larger. As shown in FIG. 9, the key chain display device comprises: a flexible PC board 99 (optional, could use nonflex board with flex conductors or spring metal tabs to allow the display to fold), LEDs 12 mounted to the flexible PC board 99; a microprocessor 13; and batteries 15 which contact the flex PC board 99 (PC board made of thin flexible plastic) to save construction time and cost by eliminating standard-type metal terminals. The device also includes a non contemporary centrifugal switch, which comprises an impact weight 100 that impacts the flex PC board 99 on its insulated side of two sandwiched flex PC boards. Exposed metal between the two flexible PC boards makes contact when the display is swung back and forth from the weight impacting the sandwich configuration of the flex boards. The non-conductive case of this device is made of plastic with a hinge 101 and display cover 98 and snap lock mechanism 25 to keep display cover 98 closed. A battery door 84 allows the batteries to be replaced. The main body 93 has an attachment ring 102 that allows for a chain 103 of key rings to be attached. A light could be installed in the device, to help the user to insert keys in keyholes at night, etc.

Other embodiments can include display devices with housings in the shape of game ball trinkets, miniature hatchets or baseball bats, and other types of items sold at sports matches. They could be children's novelty toys, such as play light display swords.

Figure 10:
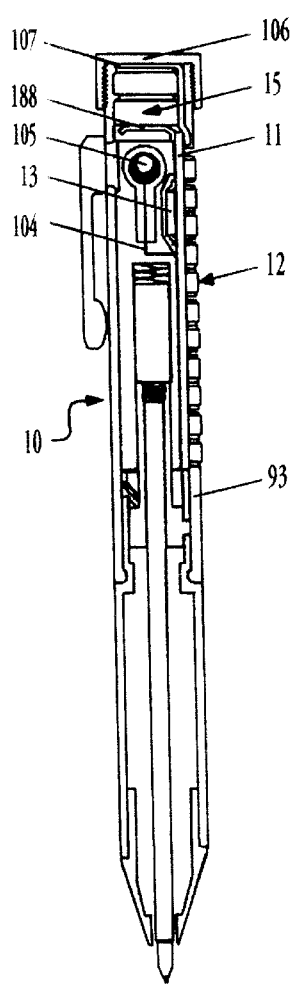
FIG. 10 is a side elevation view of a fifth embodiment: a pen display device according to the present invention, shown without an outer covering.

FIG. 10 Pen Display Device

A fifth embodiment of the present invention is shown in FIG. 10: as a cross sectional view of a pen display device. The display pen works very similar to the hand held units except that the display here is installed in a pen. This display could be pre-programmed or operator programmed, with and without extra operator programming display.

The pen display device comprises: the main body 93, which contains the PC board 11 with surface mounted LEDs 12 evenly spaced apart in a row, and a microprocessor 13, which controls the LEDs 12. Two alternative types of switches are preferred. A commercially available spring-loaded centrifugal switch or a wire-type centrifugal switch can be used inside the main body of the pen. In FIG. 10, a flexible spring wire 104 is attached at one end to the PC board 11. To an opposite end of the flexible spring wire 104 is attached a conductive metal ball 105. Conductive metal is wrapped half way around the inside wall of the main body 93 in the area where the metal ball 105 is, and is attached to the PC board 11. When the device is moved by the user, the conductive metal ball 105 swings back and forth with the motion and makes contact with the conductive metal (non shown). This operates the display and keeps timing. To supply power, one or more small, removable batteries 15 are inserted into the end of the pen by removing the pen end cap 106. Under the pen end cap 106 is a conductive metal strip 107 that bends back to install the batteries. This metal strip is soldered to the PC board 11. At the other end of the batteries 15, another second conductive metal strip 108 puts power to the PC board 11. The rest of the pen operates like a standard, adjustable ball point pen. It could alternatively be a mechanical pencil, a non-adjustable pen tip, a click-in, click-out-type writing instrument, a marker, a pen light, or even a non-writing, pen-like instrument. A digital or analog-style watch can optionally be incorporated into the pen so that the time is displayed when the pen/watch display device is moved back and forth by the user. Alternatively, the pen device could be hinged in the middle to bend approximately 90 degrees to allow the operator to spin the pen device in his or her hand in order to operate the device similar to a motorized spin display device of the present invention.

Figure 11:
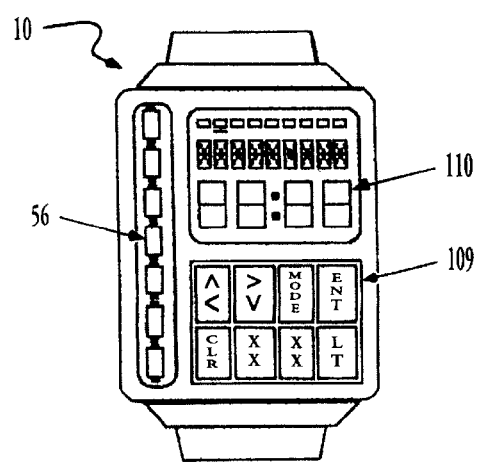
FIG. 11 is a plan view of a sixth embodiment of a display device according to the present invention: a wrist watch display device.

FIG. 11 Watch Display Device

A sixth embodiment of the present invention is shown in FIG. 11: a watch display device. This watch display device operates as a normal digital watch except that it contains light emitters, preferably flush mount LEDs 56, which provide a visible display when the person wearing the device swings or otherwise moves his or her arm. The control buttons 109 can be manipulated by the user to program the display with messages and graphics. These control buttons 109 could be mounted anywhere on the watch. Control button 109 legends and functions vary depending on the algorithm used to operate the watch display. The time could be displayed in a digital display 110, or an analog display, or a combination of both. The time can alternatively be displayed by the LEDs with the user's movement. This device would be useful, for example, for a jogger or any person exercising to use during or after jogging or other exercise to monitor his or her heart rate or running time. To further make the display device user-friendly, the entire watch can be made to spin at any angle or easily removed altogether to be hand held. This allows the user to operate the watch display device so that it can be easily viewed from any angle.

Figure 12:
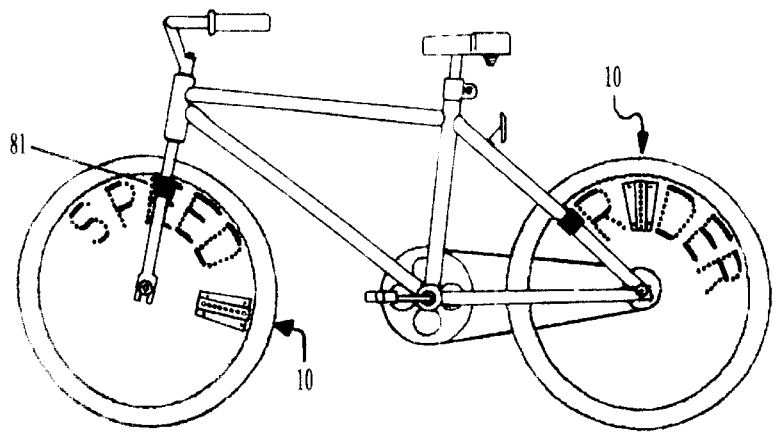
FIG. 12 is a side elevation view of a bicycle with a seventh embodiment of a display device according to the present invention.

FIG. 12 Bike Display

A seventh embodiment of the present invention is shown in FIG. 12: a bicycle display device. Referring to FIG. 12, this device 10 is for use on bicycles or the like. This device is easily attached to the spokes (or rim or hubcaps) of a wheel or wheels on a bicycle, tricycle, unicycle, car, motorcycle, etc. A child, for example, might enjoy having a display which flashes his or her name, a favorite comic book character, or a college sports team symbol to on-lookers as he or she rides past. The device can be pre-programmed or user-programmed. The present bicycle device could be included in a kit with mounting hardware for the device, and optional external reed switches and a magnet and mounting hardware allow user to install on frame of bicycle and using tire rotation to control speed and turn on/off display. The device preferably has LEDs along both sides so that the display can be viewed from either side of the bike.

This bike device resembles the hand held device shown in FIGS. 6 and 7, except a tilt switch instead of a centrifugal switch activates the display. Alternately it could include a reed switch and a magnet. The device 10 with a built-in reed switch (preferred) can be mounted on the spokes, with the magnet 81 mounted on the frame. Alternatively, the device can be mounted on the frame with an externally wired reed switch mounted to the frame in close proximity to the spokes, and the magnet can be mounted on a spoke in a position suitable for activating the reed switch. Alternative means for activating the display other than reed switches include photosensors, hall effects sensor(s), proximity sensor(s), and contact-style switch(es). The device can also be used on the rim or hubcap of the wheel of a vehicle.

Figure 13:
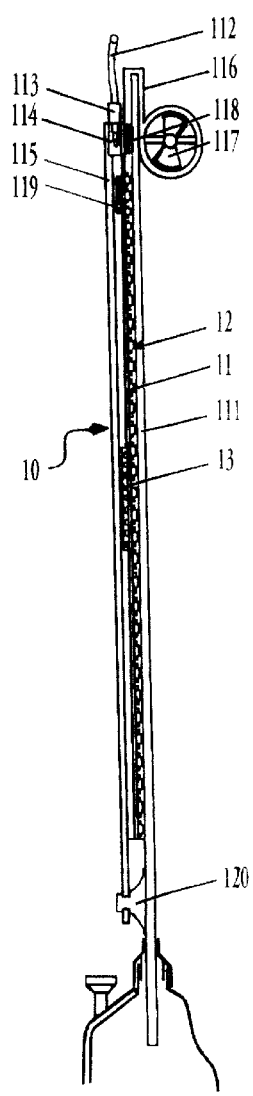
FIG. 13 is a side elevation view of a eighth embodiment of a display device according to the present invention: a vehicle window display device, shown without an outer covering.
Figure 14:
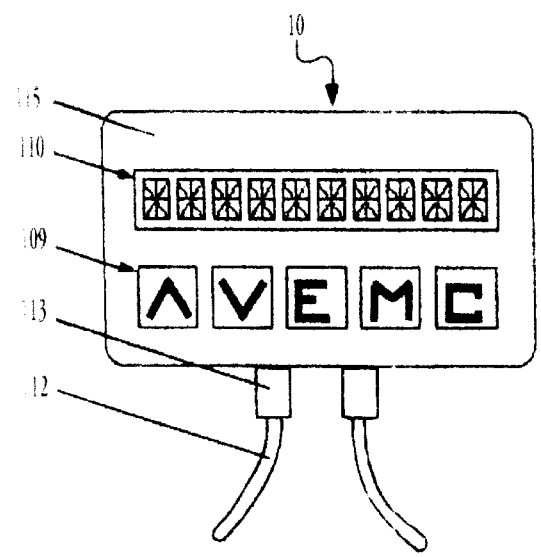
FIG. 14 is a perspective view of a remote controller for a programmable display device according to the present invention.

FIGS. 13, 14 Car Window Display Device and Car Display Controller

An eighth embodiment of the present invention is shown in FIG. 13: a vehicle side window 111 display device. This vertical rod display device attaches to a side window, preferably the inside, of an automobile, truck, or any other type of vehicle. When the vehicle moves, the display device displays text and graphics through the vehicle window. To turn on the display and to control the speed at which the display operates (i.e., to keep the display proportional), the device could include a sensor that monitors the rotation of the vehicle wheels, the drive shaft, or the vehicle's speedometer. FIG. 14 illustrates a remote controller for the programmable display devices herein. A remote controller could be included, for example, with a car window display device so that a user can control the display device from a short distance away.

As shown in FIG. 13, the display shown in a cross sectional side view mounted on a automobiles car door window 111 includes a PC board 11 with LEDs 12. The display is controlled by a microprocessor 13 which is fed power and data via a multiconductor cable 112 with a male connector 113 and a female connector 114 built into the display. The plug is removable so the device can be removed from the window as desired. The display and the female connector 114 are mounted and encased by a plastic enclosure 115. On the top by the female connector 114, there is a metal clip 116 which attaches the display to the top of the car window. On the metal clip 116 on the outside there is a metal turbine 117 which changes RPM with the increased speed of the vehicle. On the display PC board 11 is mounted a pick up coil 118 with amp comparator/circuit 119. This supplies the microprocessor 13 with information regarding the rate of speed of the vehicle in order to keep the display proportional. To keep the display properly positioned, a suction cup 120 can be employed.

Speed can alternatively be monitored by temperature measurement. A small wire heating element is mounted externally on a clip in close proximity to a sensor which monitors outside temperature. When the heating element is heated to a certain temperature and turned off, the time that it takes to return to ambient temperature is translated in the microprocessor algorithm into wind speed which would be the approximate vehicle speed. This controls the timing of the display to keep the display consistent even during changes in vehicle speed. Alternately, speed can be determined by photo sensors, reed switches, etc., using speedometer, drive shaft to detect speed.

An alternative way to detect speed as in FIG. 13, a small propeller 117 is encapsulated externally on the clip that holds the device on the vehicle window. As the vehicle moves faster, the propeller spins faster. External or internal sensors monitor the propeller speed. Means may include an emitter/photosensor which is located inside or outside the vehicle. Light is reflected or broken, depending on the type of sensor and the mounting location.

Alternatively, this vehicle window display device can be increased or decreased in size, or mounted on the outside of a vehicle. It could also be made thin enough to be part of a magnetic sign like an advertisement on the side of a vehicle. During the day, the observer can see the sign and at night they see the light display built into the sign. Power could be supplied with a coil that picks up electromagnetic, data, power and timing through the vehicle's body with a matching electromagnetic transformer. The magnetic portion of the sign is optional. This device could be mounted on a vehicle antenna, with certain modifications.

FIG. 14 shows a car display remote controller device. In FIG. 14, an alphanumeric display 110 is mounted in an enclosure(graphics display could be used) 115 with control button 109 to allow the user to program and call up messages and down load to the display. The display controller device has its own built-in microprocessor (not shown) that enables all functions and controls the graphic/alpha-numeric display 110. Shown are two male connectors 113 and cables 112, one comes from a vehicle battery or fuse box and the other sends power and data to the display. The display is mounted in or on the vehicle. Hard wiring is an inexpensive and reliable way to send data to the display, but there are many other ways to send data with the car display controller device, including RF, infrared (IR), ultrasonic, etc., or the display can stand alone. The car display controller device can alternatively be used for user-programming of other devices of the present invention. Each controller/programmable display device may differ in layout and capabilities, depending upon the intended use for the device.

A remote control is preferred for use in various embodiments of the present invention. It allows the user to program a user-programmable device according to the present invention. Preferably, the remote control has its own microprocessor and a small display screen for previewing the display before downloading data to the device. The remote control preferably includes user-friendly display keys and a serial port which allows 232 communication between the remote control and a computer or directly to the display device. This is for downloading pre-programmed images and functions from the computer. FIG. 14 shows a hand-held remote control which is hard wired to the device.

The preferred ways of transmitting data between the remote control and the display are radio frequency (most preferred), including cell phones and pagers, infrared ultrasonic, and hard wire. Through the use of RS 485 communications multidrop capabilities or another similar communication network, a number of remote controls for devices of the present invention can be under software control with one serial port. This would allow for programming of two or more devices, even over distance. For example, ten or twenty devices distributed around a grocery store could be changed each day to display text notifying shoppers of the existence, price and/or location of available items. For this capability to work, remote controls and devices would both be addressable to have individual control over both.

Figure 15:
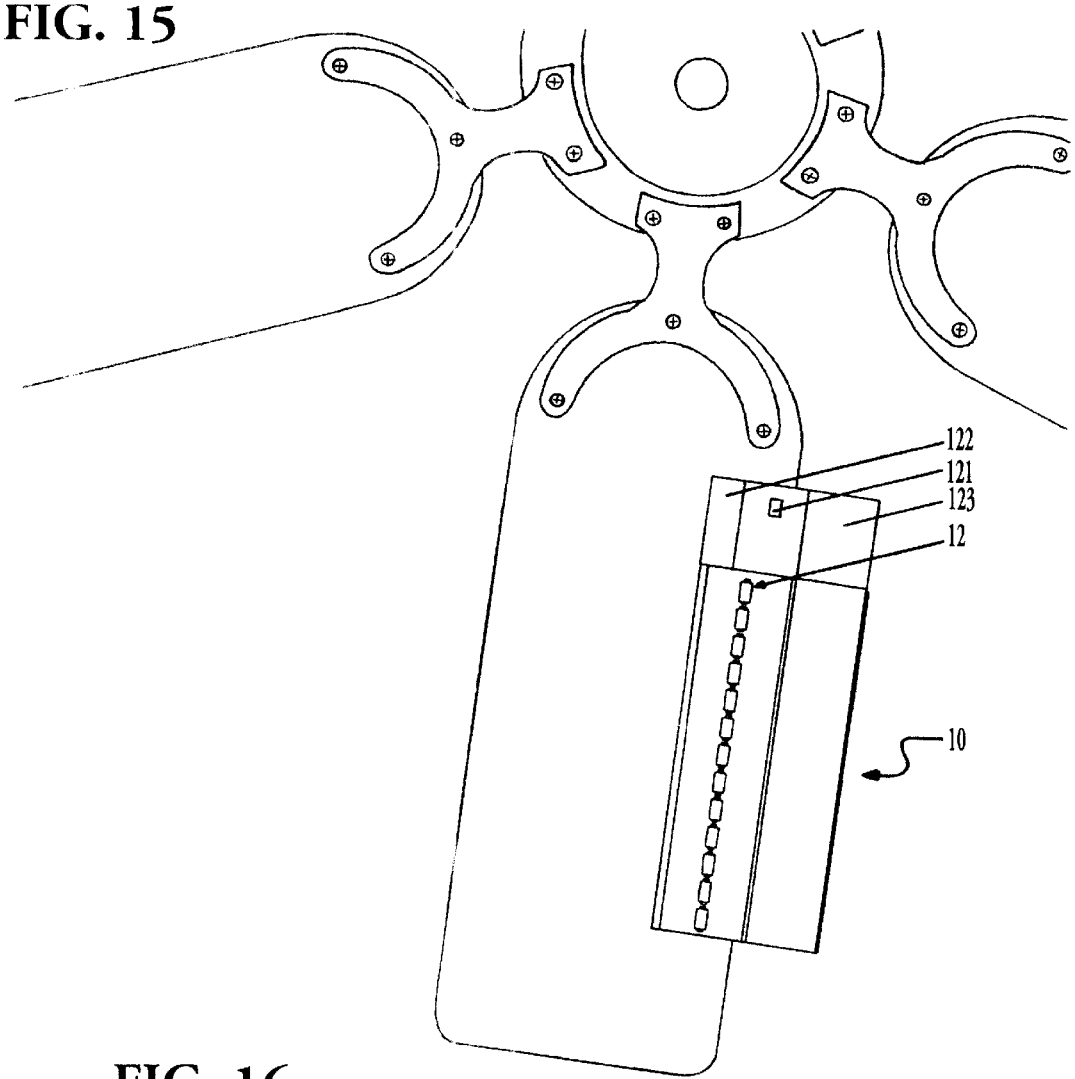
FIG. 15 is a plan view of a ninth embodiment: a fan display device according to the present invention, shown on a blade of an indoor, ceiling-mounted fan.
Figure 16:
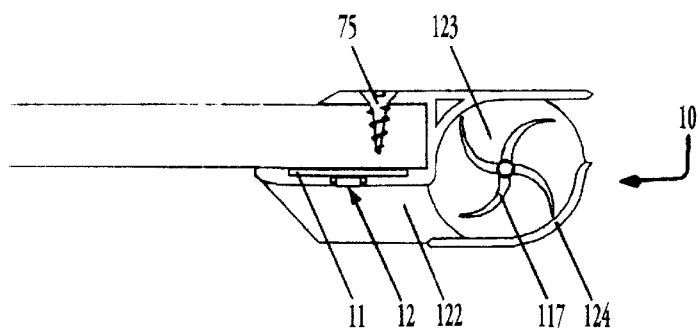
FIG. 16 is a side view of the ninth embodiment: a fan display device according to the present invention, shown on a blade of an indoor, ceiling-mounted fan; with its end cap removed.

FIGS. 15, 16 Fan Display Device

The fan display physically resembles the hand held display embodiment. In use, it resembles the spin display embodiment. The use of a turbine/generator allows this fan display to operate without batteries, although batteries can feasibly be used for inexpensive embodiments. The rotation speed of the turbine/generator is in direct relation to the speed of the fan, which controls the speed of the display text, etc. The display is preferably user programmable using a remote control.

This embodiment comprises of LEDs 12, a PC board 11 with a microprocessor, an EEPROM (memory storage), a smoothing capacitor, an OP amplifier/comparator circuit (for speed detection), a volt regulator, and an IR receiver 121 module with TTL output. These are preferably all enclosed in a plastic molded case on the inside end 122 of the display. The inside end 122 of the case contains an electrical generator 123 which has a turbine 117 connected to the shaft. The shape of the turbine 117 and the housing with an air-diverter 124 designed to be aerodynamically efficient and operational regardless of which direction the fan is spinning. The display is mounted to the fan blade and attached with screw(s) 75. The display preferably also contains counterweights to balance the fan (not shown). The displays that are battery powered could use the batteries as counter weights.

Alternatively, the display could be mounted vertically, internally in the blade or at an angle, stationary or user adjustable, power and timing could come from a belt around the body of the fan which drives a generator. The device could also include a wheel that is spun as it rolls around the body of the fan that would drive a power generator or with use of slip rings to transfer power to the display. Electromagnetic energy could be induced through the use of a set of coils parallel to or encompassing each other or on the fan's stater in the motor. The primary coil will induce AC power to the secondary coil which uses this power after it is rectified to operate the display.

It could also have batteries or a solar cell to charge one or more batteries to allow operation of a device according to the present invention in the dark. An alternate fan propeller design could also be employed. An alternative embodiment could be installed in or on helicopter or airplane blades for use as advertisement or instructions to persons viewing.

An alternate embodiment of the present invention could be installed in a fan (preferably a ceiling fan), windmill, windspeed detector, paddlewheel, helicopter blade, or propeller (preferably free-wheeling). These are spun by air movement across the wind-catching surfaces. This embodiment could be installed in a stationary position, held in a person's hand, or attached to a moving bicycle or vehicle.

Figure 17:
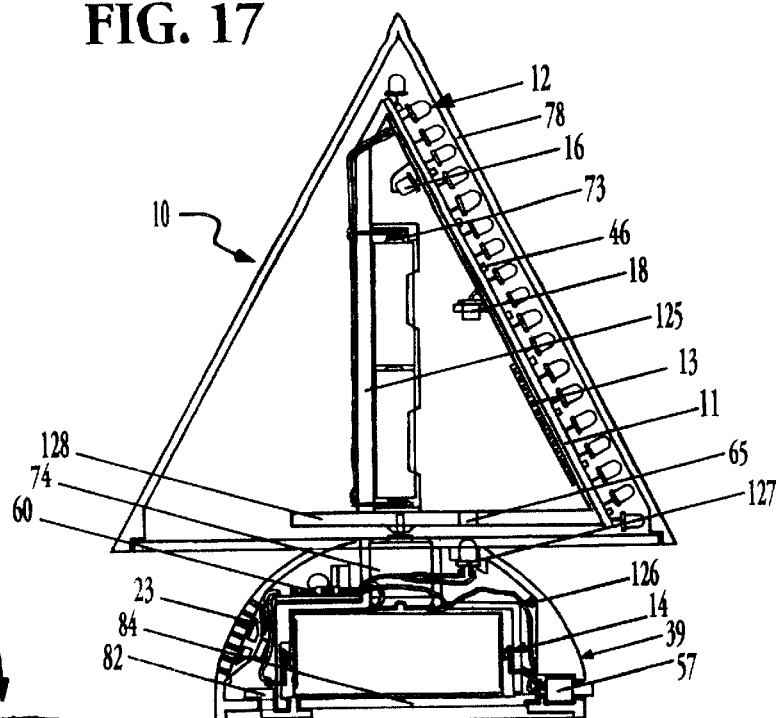
FIG. 17 is a side elevation view of a tenth embodiment of a display device according to the present invention: a Christmas-tree shaped display device; shown built with a clear cover.

FIG. 17 Christmas Tree Display Device

Since devices according to the present invention can be inexpensively made, special holiday display devices displaying designs or slogans to suit the particular occasion are feasible. For example, devices according to this invention could display a Christmas angel, a Star of David for Chanukah, a turkey for Thanksgiving, a flag for the Fourth of July, or a bunny or basket for Easter. Birthday, wedding shower, or baby shower versions with appropriately colored lights could feature a birthday cake or toy car, wedding bells or doves, or a cradle or baby booties.

FIG. 17 shows a tenth embodiment of the present invention made with transparent or translucent plastic cover: a Christmas tree-shaped display. This display would likely include multi color LEDs that can display in green, red, orange and yellow. In operation, the display would show a green Christmas tree outline with blinking red, orange and yellow "ornaments" and a star on the tree. Alternatively, ASCII characters can be used to display words, graphics, and amusing light shows. This device may also emit music, sounds, and/or human voices.

Preferably, a display frame 125 supports all of the items needed to operate independently. On the vertical support of the display frame 125 is mounted a commercially available battery stand 73. The display frame 125 is off-center to allow the weight of the batteries to counterbalance that of the display board 11 and its components. Snap(s) 46 allow easy mounting of the display board 11 to the display frame 125. Also included are a display board 11, a plurality of LEDs 12, a microprocessor 13, and a photosensor 18 with a TTL rated output. Preferably, each LED 12 is run directly by two I/O pins to enable multiple colors from each LED.

An on/off switch 57 wired from the battery(s) terminals 14 mounted in the base battery holder 126 which is molded in the tree base 39. When the on/off switch 57 is turned on, the battery(s) feeds power to the motor 74. This initiates rotation of a display frame 125 and enables an IR transmitter 127. The centrifugal switch 16 make contact which wakes microprocessor 13 and enables IR receiver 18. When a hole 65 in the bottom of a circular portion 128 of the display frame 125 lines up with the IR transmitter 127, the IR receiver 181 enables the circuit and allows the microprocessor 13 algorithm to keep the timing. When the motor circuit is enabled, the sound chip 60 plays music through the speaker 23 or a pezio element. The bottom of the tree base 39 allows entry into the a battery compartment 73. The lid of the battery compartment 84 may be removed with a quick release latch 82. The top of this rotating display can be covered with a removable, clear or translucent cover 78, which protects the display and allows better visibility during the day.

Figure 18:
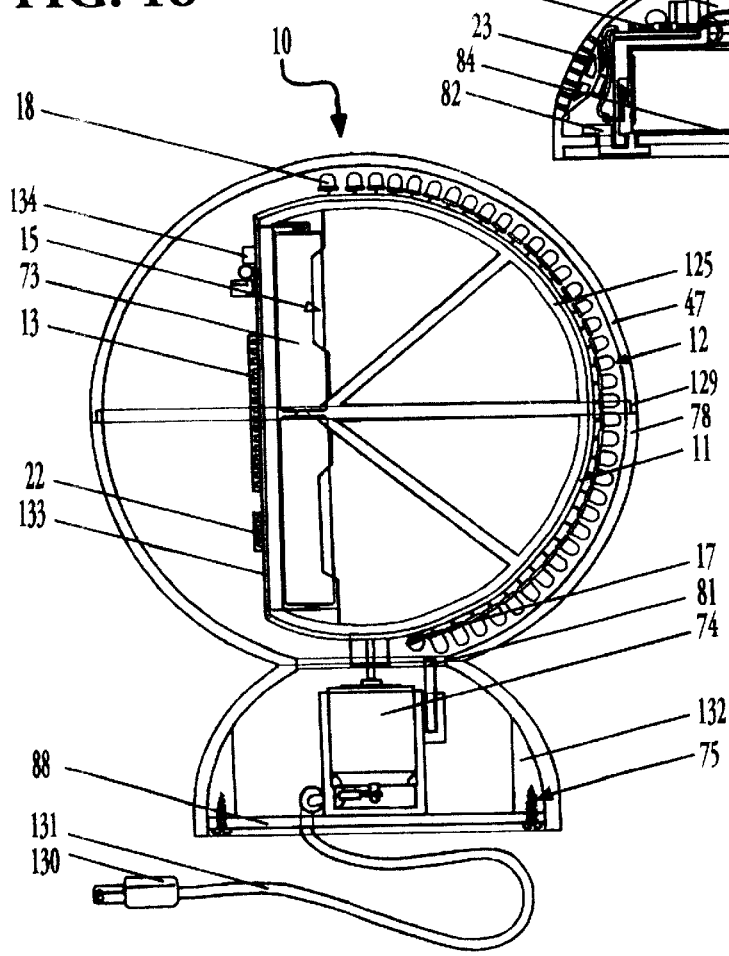
FIG. 18 is an elevation view of an eleventh embodiment: a plug-in, globe-shaped display device according to the present invention, shown built with a clear cover.

FIG. 18 Globe Display Device

Referring to FIG. 18, a globe display is circular and preferably made of clear or translucent plastic 78. The top outer case 47 of the globe is removable at seam 129 to allow the user to replace batteries 15 in the battery holder 73. Some models may use a motor (generator or coil) to induce power for device 10 with these options. It is possible to eliminate the removable top or make it permanent during manufacturing to eliminate a seam 129. The bottom 78 of the globe display is made of the same material as the top of the globe display. The base 88 is where the motor 74 is mounted. A preferred motor for use in this embodiment in the United States is a 120 volt AC synchronous motor. There are many other suitable types of motors. A reduction system can be employed to increase torque and reduce RPM to a more user friendly speed. A male power plug 130 and cord 131 conveys power to the motor 74. The base 88 is secured to the bottom of the globe 78 with screws 75 which are set into a standout 132. The standout 132 can be molded into the bottom 78 of the globe. A magnet 81 is attached to the base 88. This is used for timing of the display by activating a reed switch 17 or a hall effects sensor. Other types of sensors may also be suitable. The sensor also initiates operation of the display when it senses motion and proper speed.

The globe display framework 125 supports the main PC board 133, which contains the microprocessor 13. The microprocessor 13 controls the display LEDs 12, which are installed on a thin, flexible display PC board 11. Traces are connected in both locations where the main PC board 133 and display PC board 11 meet. The main PC board 133 preferably also holds an EEPROM 22, which increases display messages and graphics storage capabilities. Also the main PC board will contain an infrared demodulation circuit 134 and an infrared receiver 18. The infrared receiver 18 is installed on the main display PC board 133 on the top where the view is unobstructed and maintains the same location when in operation.

An option for the globe display is to incorporate two or more display PC boards in the device to enable 3D graphics. Concave PC boards could be placed inside the globe against the inner wall in successive layers. Alternatively, a flat PC board could be inserted inside the globe between the display PC board in the battery mount. This flat PC board would be filled with LEDs in successive rows.

Figure 19:
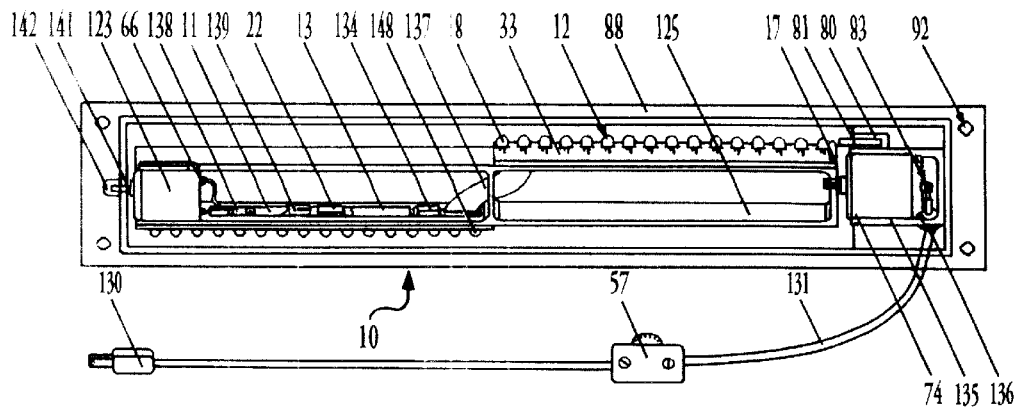
FIG. 19 is an elevation view of a twelfth embodiment: a cylindrical display device according to the present invention, shown with a clear cover.
Figure 20:
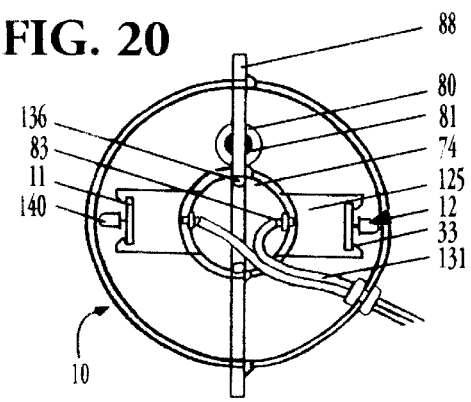
FIG. 20 is an end view of the cylindrical display device of FIG. 19.

FIGS. 19, 20 Cylindrical Spin Display Device

A twelfth embodiment of the present invention is shown in FIGS. 19 and 20 is shown in a translucent or transparent case: a cylindrical spin display device. This cylindrical display device can be hung by a chain, wire, hooks, or other means from the ceiling, or be installed on a bracket, or in a partition. Importantly, this long-lasting, fine quality display can be viewed by observers from both sides, front and back.

This display is expected to take the place of more expensive, existing, single line displays. Generally, existing single line displays are viewed from one side and ordinarily require a high number of LEDs because each character requires its own block of LEDs. In the present device, one row of LEDs can be used for all characters in the display and that row suffices for both sides of the display.

The display text for this device can be horizontal or vertical, and can be seen just as well from the front and the back of the device. This display is user-programmable with infrared (IR) sensor(s) on both display PC boards. Multicolor LEDS can be employed. Multi conductors, second microprocessors, multiplexer or shift register can be used to transmit data between the two display PC boards or one full length display PC board could be used. The display has an electrical generator which supplies power to the display PC boards and enables the display when the spin motor is turned on. The synchronous motor (spin motor) is most preferred because it can be powered by 120V AC and will always stay at the same RPM, which can be slow and powerful enough to eliminate gear reduction drives. One or two display PC boards can be employed.

This display preferably includes a base 88 which supports the synchronous spin motor 74 which is installed in the motor mount 135 with motor mount locking tabs 136 that keep the motor from spinning in the motor mount 135. The power cord 131 is connected at one end directly to the motor power terminals 83. At an opposite end, the power cord 131 is connected to the plug 130. A commercially available power switch 57 is attached in-line on the power cord 131 to turn the display on and off.

Referring to FIGS. 19 and 20, next to the motor mount 135 is a magnet mount 80 and magnet 81. A reed switch 17 is mounted on a secondary display PC board 33. The reed switch 17 is activated by the magnet 81 as the PC board spins by. A row of LEDs 12 is mounted on the second PC board 33. An infrared IR sensor 18 is also mounted on the second PC board 33. A multi-conductor ribbon cable 137 connects the LEDs 12 and the reed switch 17 to a main microprocessor PC board 11. The main microprocessor PC board 11 comprises the microprocessor 13, an EEPROM 22, a regulator 138, a smoothing capacitor 139, a second infrared IR sensor 140, and a demodulation circuit 134 for the infrared sensors. The PC boards and the electrical generator 123 are mounted in the display frame 125. The generator 123 is wired 66 to the main display PC board 11. The generator shaft 141 is attached to the base 88. At one end, the base 88 comprises a reinforced hole 142 through which the generator shaft 88 is press fit. The base 88 has mounting holes 92 to hold the device by means of cut-out hole or hanging hardware. The base 88 and display cover are translucent with a slight tint. The removable display cover snaps on over the display.

Figure 21:
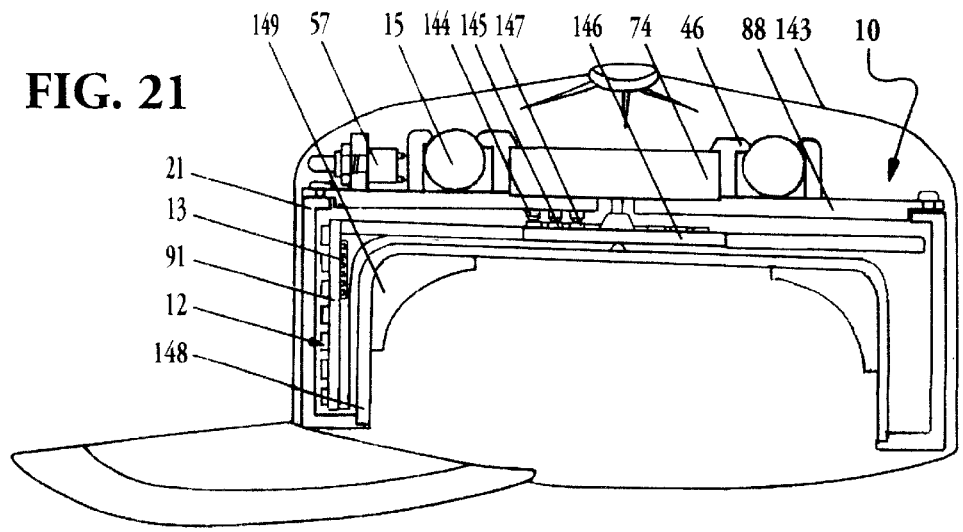
FIG. 21 is an elevation view of a thirteenth embodiment: a display device according to the present invention, shown in a net fabric style baseball-style cap.

FIG. 21 Cap Display Device

FIG. 21 shows a baseball-style cap display device in its preferred embodiment. The present device can be built into a cap at the manufacturer, or inserted by the consumer into an existing cap. This cap display device works similarly to the circular display device shown in FIG. 4, except that here there are size and shape limitations. The cap itself preferably made of netting or a clear or transparent plastic on top so that the display device is visible. The cap display device could be used, for example, as a novelty item, or to display an advertisement, and/or a logos. These would be popular for example, at college sports events, where the wearer could display his or her team initials or logo.

The cap display device comprises a base 88 in which the motor 74 is mounted. Ideally this is a stout (short) motor with housing of a proportionally larger diameter. This allows the device to fit under the hat 143 easily with plenty of power. Alternatively, a smaller motor mounted horizontally with a gear drive system could be used. To allow ease of construction and to hold battery(s) in places snaps 46 are mounted into the plastic parts. When a switch 57 (push on/push off) is pressed, the power from the battery(ies) 15 goes to the motor 74 and slip ring brushes 144. Rotating slip rings 145 are etched onto the top side of a double-sided, "slip ring PC board" 146, and supply power and timing. Via(s) connect bottom side traces that go to the display PC board 91. Timing is accomplished by using a timing slip ring 147. The timing slip ring 147 is broken in one spot to allow the microprocessor's 13 internal programmable pull-up resistor on that pin make the input go high (logic 1). Thus, the device "knows" when to start and how fast to run the message display.

LEDs 12 mounted on the vertical display PC board 91 illuminate through a outer clear circular protective cover 21, as shown in FIG. 21. A black protective circular ring 148 rests on top of the user's head and preferably has ergonomically shaped, absorbent cushions 149 mounted inside to cushion, ventilate, position, protect the user's head. To further increase the comfort of the user, holes in the inner black protective circular cover 21 allow movement of the display, as well as ventilation. The vertical display PC board 91 is counterbalanced with an increased PC board area on the opposite side to allow for smooth movement.

Figure 22:
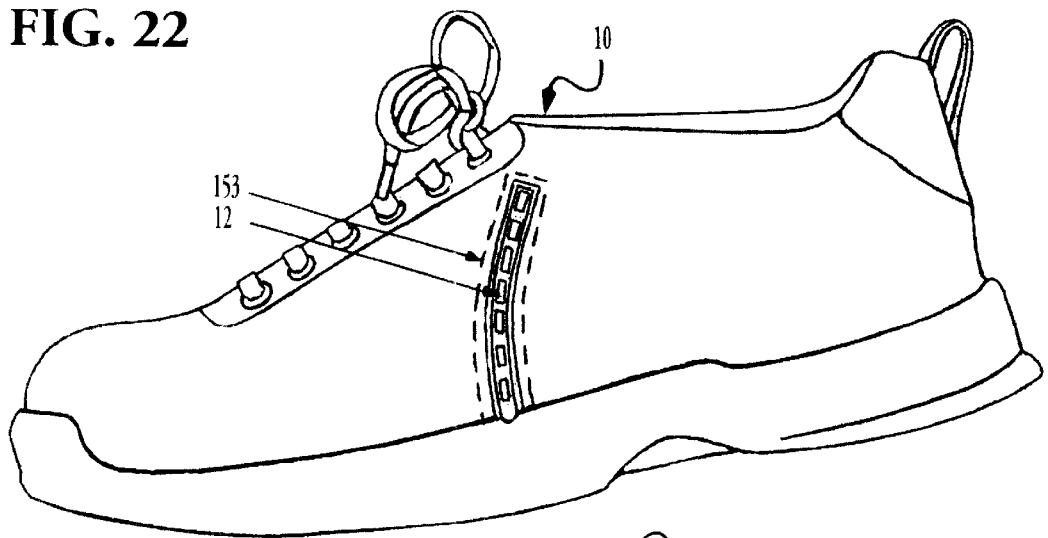
FIG. 22 is a perspective view of a fourteenth embodiment: a shoe display device according to the present invention.
Figure 23:
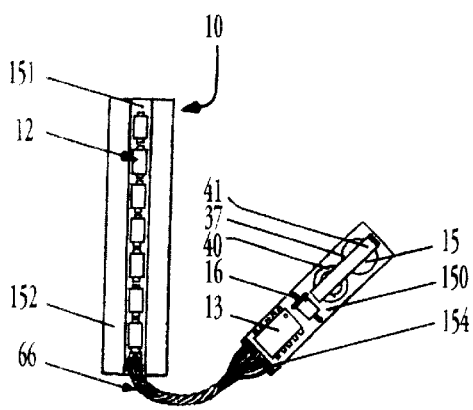
FIG. 23 is a side elevation view of the shoe display device of FIG. 22, shown without a shoe.

FIGS. 22, 23 Shoe Display Device

A fourteenth embodiment of the present invention is provided in FIGS. 22 and 23: a display device recessed into the side of an athletic shoe. One or both shoes in a set could include a display device. Both devices in a set of shoes could display the same message or character, or the displays could be different or complementary to each other. The shoe display device is useful for advertisement, games, and safety. When the user walks fast or runs, a centrifugal switch activates the display. In skates or special shoes for skate boarders, bikers, etc., a special switch can be included in the design to allow continuous running of the display. When the display is on skates, timing can be implemented using the rotation of wheels and sensor input(s) as discussed herein for other moving displays. Shoes, especially exercise shoes, are often subjected to rigorous punishment. This design includes features for minimizing damage to the electronic circuits of the present device from normal shoe wear and tear during use. Also, the device is recessed in the shoe upper so that the display is visible, unobtrusive, and comfortable to the wearer.

The display can employ LEDs, incandescent lamps (preferred herein). These have various advantages: some allow good visibility in daylight, others are visible only at night. For good night visibility, a light sensor could be included to only allow the device to operate during darkness, thus conserving power.

As shown in FIGS. 22 and 23, a PC board 150 supports most of the electronics. The PC board can be embedded permanently in the shoe sole, or inserted into a depression and molded in the upper portion of the shoe sole. The PC board is preferably placed under the removable cushion insert in many shoes. It preferably is placed perpendicular to the length of the shoe. A microprocessor mounted on the PC board controls the lights and senses motion with the PC board-mounted centrifugal switch 16. This circuit preferably does not require an on-off switch because the microprocessor 13 goes into sleep mode (typically 2–3 microamps) and wakes up upon receiving an input from the centrifugal switch 16. Small, high current, watch size batteries 15 are preferred to keep the circuit light and small. Conductive pads are attached on the PC board where the battery(s) are installed. A conductive metal strip 41 snaps into place to tie the negative 40 and positive battery 37 terminals together. The batteries 15 are held in place with the shoe cavity limiting their movement.

Because shoes, skates, and ski boots stretch, get wet, and are flexible, it is preferable not to install the lights 12 on a PC board 150. Instead, incandescent lamps 12 (which are preferably the approximate size of a grain of rice) with relatively long wire leads 66 are put into clear shrink tubing 151 lined with sealant. The incandescent lamps 12 are in series. When the shrink tubing is heated during manufacturing, it shrinks and permanently seals the tubing 151. As shown in FIG. 23, the tubing with the embedded incandescent lamps 12 is placed into a translucent plastic envelope 152 and sewn 153 into the shoe. This will reduce damage to the light array during shoe use and allow flexibility. The main PC board 150 should be sealed to keep the connections 154 and the PC boards dry and protected.

Alternative locations for the lights and circuit board include horizontal placement in the ankle, toe, or heel sections of the shoe. When installed in the heel or toe sections, the entire circuit, including the lights, can be installed in a clear or translucent sole. Flexible "light pipes" or fiber optics may extend from the lights to the outer edge of the sole.

This device enhances safety, since the wearer's shoes light up at night, and provides interest to the wearer and to on-lookers. Children would especially enjoy wearing athletic shoes with a message or character display from this device. With devices that require a flexible light circuit in a remote location, for example, jump rope, swinging rope, child's swing, clothing, hollow, circular ring (e.g., necklace or bracelet), clear tube, or rod could be attached to the circuit as is discussed in the shoe display because of the flexible wires to the display lights.

Figure 24:
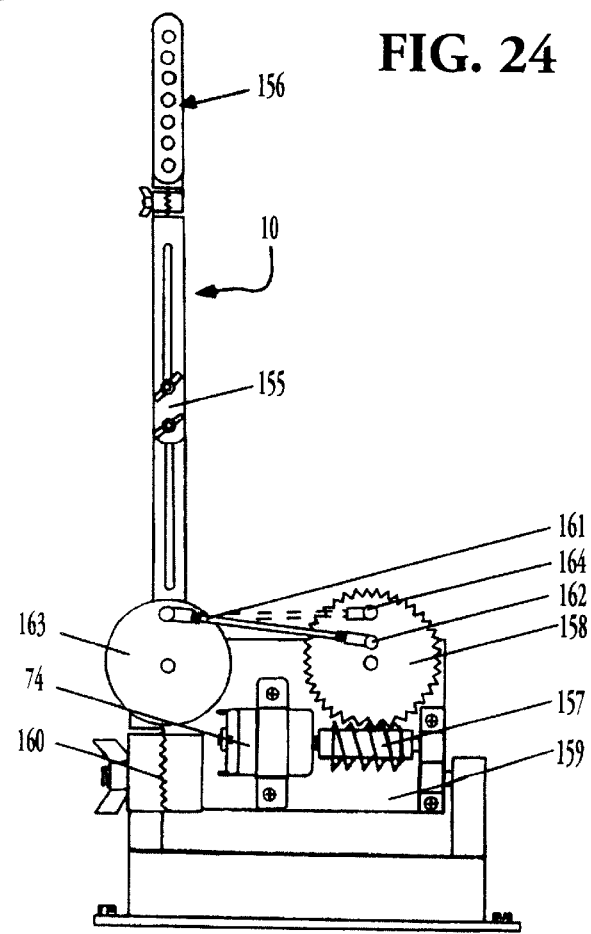
FIG. 24 is a side elevation view of a fifteenth embodiment: a hand-held display device according to the present invention, shown mounted on a mechanical arm.

FIG. 24 Mechanical Arm Display Device

FIG. 24 shows a hand-held display device mounted on a motorized mechanical arm that swings in a back and forth motion. This is a fifteenth embodiment of the present invention. To give the display device added versatility, the mechanical arm portion has movable knuckles and extension slides. The base knuckle enables the display to be angled up to 90 degrees forward and 90 degrees backward in respect to the position shown in FIG. 24.

As shown in FIG. 24, the mechanical arm display could be set on a desk for operation. For example, the user could mount the display device on the back ledge of an automobile and angle the mechanical arm 155 back to follow the inward slope of the rear window. The display device could alternatively be mounted horizontally on a wall. In operation, the display portion 156 resembles a line display when it is rotated up vertically.

A motor 74 with a gear reduction system is included in the device to slow down the motor and increase the torque. A worm gear 157 drives a large pinion gear 158. The gears 157, 158 are attached to a motor mount arm 159 extending off from above a base knuckle 160. Since the motor 74, gears 157, 158 and motor mount arm 159 all swing on the same axis, the base knuckles 160 allow operation at any angle. The pinion gear 158 acts as a crank shaft. A connector rod 161 is attached at both ends with ball attachments 162. The connector rod 161 is attached at one end to a display drive arm wheel 163. At its other end, the connector rod 161 is attached to a large pinion gear 158. The ball attachment 162 attached to the large pinion gear 158 is movable to allow different types of display operation: from full circle to windshield-wiper-type operation. FIG. 24 shows a vertical display for windshield wiper-like operation. For full circle operation, the user can move the connector rod 161 to a second outer position 164 on the pinion gear 158. The user can also adjust the base knuckle 160 so that the display arm 155 is horizontal.

With the display portion 156 pointing up vertically, a display that rotates at 360 degrees results. By adding a second display unit, both a vertical and horizontal display can be achieved.

Figure 25:
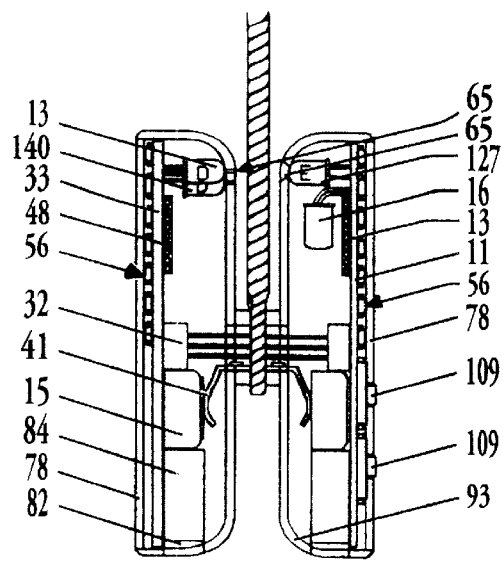
FIG. 25 is a front elevation view of a sixteenth embodiment: a yo-yo display device according to the present invention.

FIG. 25 Yo-Yo Display Device

This display design could be miniaturized and installed in a yo-yo. Preferably, the circuits 11 and 33 could be mounted inside one or both halves of the main body 93 of the yo-yo. Multiple microprocessors 13 and 48, or serial/parallel, input/output chips also could be used to reduce the number of conductors (jumpers 32) between each yo-yo half. The display LED 56 could be mounted vertically along a radius of one side of the yo-yo, and/or horizontally across the edge of both halves of the yo-yo. User programmable button(s) 109 could be installed to allow the user to put in his or her own messages. The yo-yo outside face 78 would preferably be clear or translucent so that the display is visible. A photosensor could be inserted instead of a reed/magnet switch as discussed herein. With IR photo emitter(s) 127 the photosensor 18 would sense the yo-yo string passing by holes 65 between each yo-yo half and thus keep timing like a reed/magnet switch would and with a second photo sensor 140 direction could be determined to keep lettering in proper direction. A centrifugal or tilt switch 16 could also be included to wake up the microprocessor(s) when the yo-yo is in use. The display could have full size letters and graphics on the way up and down, graphics, sentence text when the yo-yo is spining at the end of the string. The yo-yo would use small batteries 15 mounted in each half to counterbalance display boards 11 and 33 and the device 10, a single spring metal conductor 41 could jump between batteries 15. The batteries 15 would be inserted in two battery doors 84, being held in place with battery door locking tabs 82. Miniature versions of this embodiment could be included in motorized and non-motorized toy cars (even a radio-controlled toy car), frisbees, game balls, and hula-hoops. This embodiment may include a clutch system(s) in the yo-yo, that could also activate display.

Figure 26:
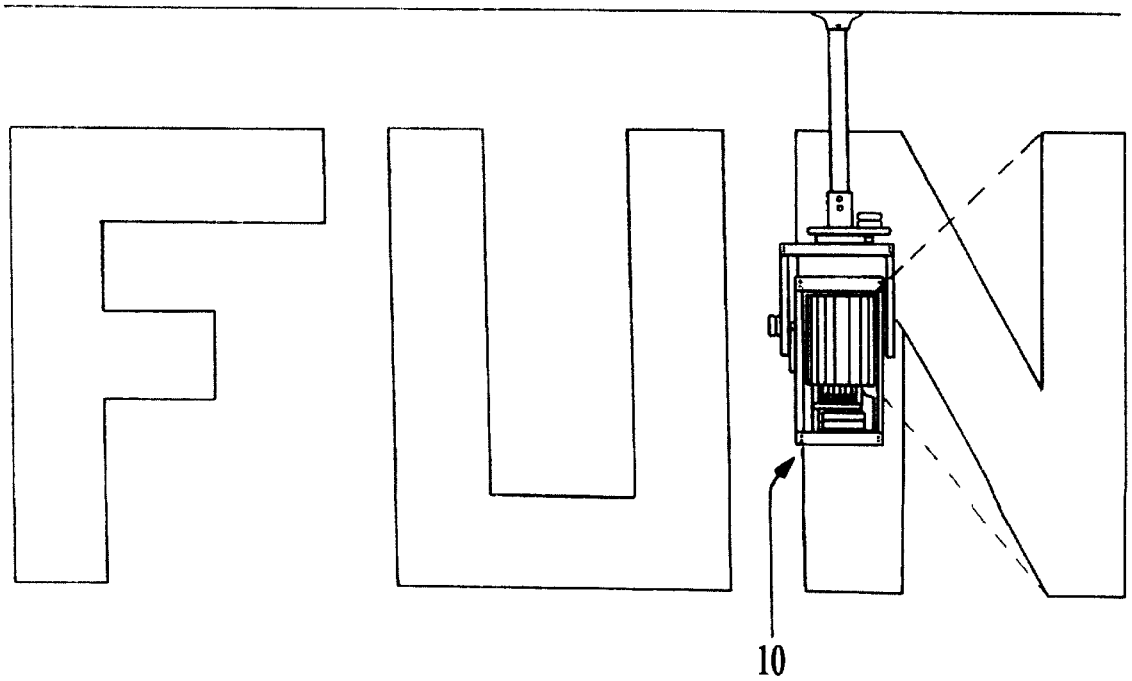
FIG. 26 is a side elevation view of a seventeenth embodiment projection display device according to the present invention.
Figure 27:
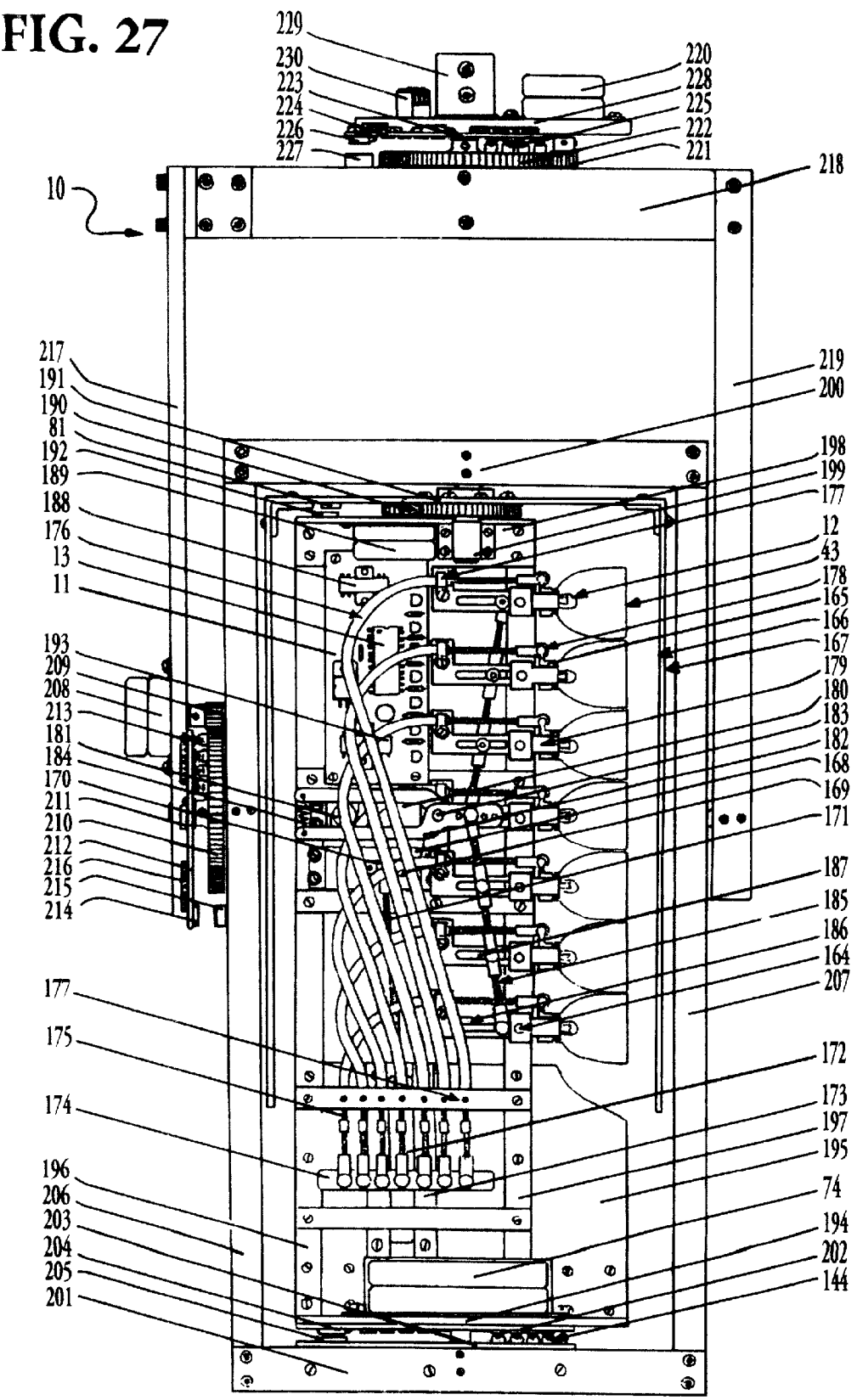
FIG. 27 is a side elevation view of the projection display device of FIG. 26, shown without color changing filters cover.

FIGS. 26, 27 Three Axis Display Device

FIGS. 26 and 27 refer to a three-axis, projection display device. Rather than having observers view the display itself as in other embodiments discussed herein, this projection display is projected on surfaces for viewing. This is a novel, microprocessor-controlled, rotating display that emits light. This projection device includes a light reflector that focuses light. Without this focus capability, the device could resemble a lamp without a shade in that it would flood the room with light. Even though the present device includes a reflector, it is preferable to focus the light to keep them from overlapping and looking like a mixed blur of lights. This device also has color changing, capability.

In this device, display lights 12 are under the direct control of a microprocessor 13. The lights flash to form different sections of characters with a main motor 74 (preferably a stepper) spinning the light array on a first, vertical axis. With the on-board microprocessor, sensors can even interface a computer, remote control, etc. With the ultrasonic transducer sensor and driver circuit, this device can calculate the distance to surfaces. This projection display device can be pre-programmed by hand, or parameters can be entered into a personal computer and controlled or downloaded. With this information, the device can focus the light bulbs. The pivoting point of light arm 164, reflector 43, reflector shaft tube portion 165, and hollow transparent tube 166 with translucent laminates 167, are shown in FIG. 26 in cross-section to better explain them. The transparent tube 166 and its laminates are cut away in FIG. 27 to show inside parts.

In use, when the reflector 43 is moved back away from the light bulb 12, the light is reflected and converged. This is done by a reflector's servo motor 168 which has an arm 169. Attached to the servo arm 169 is a ball and socket 170, or another available connection device, to transfer movement from a threaded rod 171 to slide 172. As shown in FIG. 27, slide 172 has guides 173 that allow track-like movement of a control arm 174. The control arm 174 pushes a plurality of flex shafts 175 into flexible nylon tubes 176, one tube 176 per flex shaft 175. Each tube 176 is permanently connected at both ends 177. This allows the same amount of movement to each reflector 43, regardless of light position or angle. Each flex shaft 175 is attached at its light reflector end to a reflector attachment 178. The movement of the flex shaft 175 thus translates into movement of the reflector 43. To keep the reflector 43 from twisting on the reflector shaft 179, the reflector tube portion 165 slides on a reflector shaft 179 that is hexagonal, octagonal, square, or splined (i.e. not round) in shape. The reflector shaft tube portion 165 is shown in cross-section in FIG. 27.

For different size displays at different distances from the projection device, the lights and reflector combination can be fanned out or brought in tight. This is done by using the fan-out control servo 180 attached to the fan-out servo arm 181, when the servo arm 181 is moved clockwise (looking down at servo). This spreads the main fan-out control arms 182 evenly apart. The main fan-out control arms 182 are pivoted on a stationary axis 183. When the fan-out servo arm 181 is turned counterclockwise, the return spring 184 pulls the main fan-out control arms 182 back together. Attached to the opposite ends of the main fan-out control arms 182 are adjustable control rods 185 that connect to the pivoting light reflector arm 186. The pivoting light reflector arm 186 pivots on a stationary axis 164. (This is a cut away view and does not show the keeper.) The elongated slot 187 in the pivoting light reflector arm 186 allows adjusting sensitivity and angle of adjustment.

To change the color of the display, different colored translucent lens strips 167 (cut away view is shown to allow viewing of rest of components on display) are spun in front of the lights. This allows only that specific spectrum of color to emit at any one time. Changing color is controlled by the microprocessor 13 which drives a stepper driver circuit 188 both on the main display PC board 11. As can be seen in FIG. 25, this turns the stepper motor 189 and attached gear which drive the second reduction gear 190. The gear 190 is attached to a circular plate 191. Attached to the circular plate 191 at a right angle is a hollow transparent tube 166. The different colored translucent lens strips 167 are laminated lengthwise to the outside of the clear tube 166. To allow the microprocessor 13 to know which lens 167 is in front of the lights 12, there is a hall effects sensor 192 activated by stationary magnet 81. The sensor inputs to the microprocessor 13 to let it know when the lens is in a home position. To change color, the microprocessor 13 moves the stepper motor 189 the proper amount of steps from home position for proper color.

To spin the display, a heavy duty motor is preferred for this relatively large display to work, move equipment, and overcome air friction. The stepper motor 74 is preferred to maintain a consistent rotation speed. A stepper driver circuit 193 on the main display PC board 11 will drive the stepper motor 74. The stepper motor 74 is attached to a horizontal plate 194 which is attached to a display frame. The display frame includes a vertical plate 195, two vertical frame supports 196, 197 and one top horizontal frame support 198. Attached to the top horizontal frame supports 198 is a shaft bearing 199. A vertical shaft (not shown) rides in the shaft bearing 199 and is attached to the horizontal member 200 at the top of the display frame assembly. The reduction gear 190 rotates freely on the vertical shaft at the bottom of the main display frame. The stepper motor's 74 shaft is attached and secured to the horizontal support 201 below the motor. To transfer electricity power an upper PC board 202 with slip rings etched in are attached to the 194) horizontal plate. Attached to a lower PC board 203 are spring brushes 144 that make contact between the PC boards 202, 203. There are a sufficient number of electricity lines for power, ground, and data in and data out. A hall effects sensor 204 is installed on PC board 202 and a magnet 205 is installed to horizontal support 201.

As shown in FIG. 27, the main display board is supported by a box frame comprising: the horizontal support 201, the two vertical supports 206, 207, and the horizontal member 200. A first axis stepper motor 74 is attached to the horizontal support 201. This box frame is spun with a second axis stepper motor 208. Attached to the shaft is a second axis reduction gear 209 that drives a second axis larger gear 210. Gear 210 is attached to a second axis shaft 211, which is also attached to frame member 206. Power and data is transferred via a second axis PC board 212. Slip rings are etched in the PC board 212. Spring contacts 213 contact the slip rings on the second axis PC board 212. The contacts 213 are attached with spring metal to a second axis larger gear 210. Wires are connected through the contacts 213 to slip rings which are etched on horizontal PC board 202. A second axis hall effects sensor 214 and second axis magnet 215 allow the display microprocessor 13 to determine its position. Each PC board has its own driver circuit under its own microprocessor control (PC "smart board"). Serial data is transmitted between the main display microprocessor 13 and its subordinate PC boards with slip rings.

On the PC second axis "smart board" 212 are second axis electronic components 216 containing a microprocessor, a volt regulator, an RS 485 driver, and stepper driver circuit. The PC "smart board" is addressable to allow serial data to be transmitted and received between the main display microprocessor 13. The second axis stepper motor 208 is attached to third axis left vertical member 217 with horizontal frame member 218 and vertical frame member 219. This makes up the support system for the second axis.

The third axis frame work is spun with a third axis stepper spin motor 220. Attached to the shaft is a third axis reduction gear 221 that drives a third axis larger gear 222 which is attached to a third axis shaft 223, as shown in FIG. 27. Third axis 223 is also attached to the horizontal frame member 218. Power and data is transferred via a third axis PC board 224 with slip rings that are etched into the PC board. The third axis spring contacts 225 are attached to the second larger gear 222. Wires are connected from contacts 225 to the PC board 212. A third axis hall effects sensor 226 and third axis magnet 227 allow the display microprocessor to know its position. On PC board 224 are wires between the contact points top horizontal support to the second axis PC board 212 contacts. This is also a PC "smart board," and is addressable to allow serial data to be transmitted to and received from the main display microprocessor 13. The third axis stepper motor 220 is attached to the mounting base 228. A mounting coupling 229 is attached to mounting base 228 to allow the display to be hung on a piece of conduit. Terminal block 230 on the third axis PC board 224 allows for power and communication to be terminated.

With this invention, one or more axis can be deleted, although the main axis must not be deleted. If a higher light resolution is required, additional lights can be installed. Focusing and fan-out is not required when lasers are used, unless they are line lasers.

FIG. 28 Table

Figure 28:
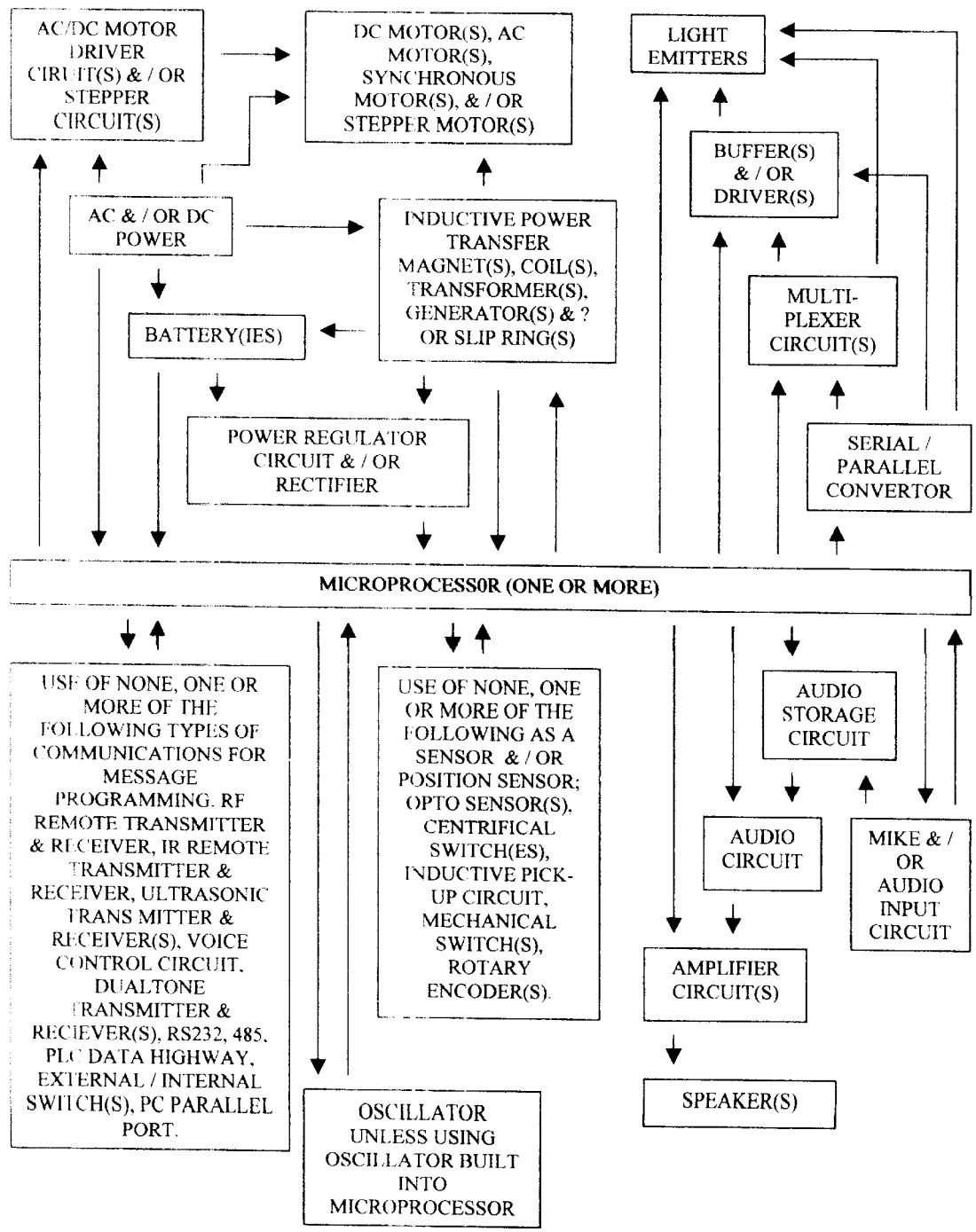
FIG. 28 is a table showing some of the components which may be included in a display device according to the present invention.

The table of FIG. 28, though not inclusive, shows some of the components which may be employed in the present device. The base unit would include a microprocessor, display lights, a device for display timing, and a power source. Possible additional components and their interactions with other components are shown in FIG. 28.

When the microprocessor is powered up, the program starts with preliminary items, such as authorizing ports, setting timers, putting values into RAM, and setting of variables. When the microprocessor is turned on or awakened, it monitors the timing input to come up with a devisory number to be used in K factor to be accessed for the timing duration. Character set or graphics are stored in a RAM or double EEPROM, EPROM, PROM, flash ROM, for example. If the alphanumeric character is to be displayed, the character is called. The microprocessor goes to the section of the program which had alphanumeric characters stored. The first portion of the character is loaded into the port and the timer is called. If the display is two sided, then the end of the last alphanumeric character would be loaded on the second port to display on the side of the display which will be going backwards.

At the timer section, the timer is initiated when the timer bit is set. The program checks the K factor number bit. If it is not set, the program clears the timer and reinitiates the timer all over again until the K factor number is set. Then the program goes back to get the next portion of the character and repeats this process all over. The same processes are repeated until all of the alphanumeric characters' spaces are displayed and there is no more data. Then the program accesses the timer repeatedly. From the time the timer switch is made and remade, the counter is increased by one each time the timer is accessed. This counter is called a devisory. The amount of diameters of the farthest light that it would take to make a complete circle is the length back and forth. On displays that are waived, this number is divided by two.

When this number is divided by the devisory, the answer is called the K factor. The K factor calls the timer and de-increments the value in the K factor each time the timer is accessed until it equals zero. The value is re-installed in the K factor. The K factor is updated each time the timer switch is made to allow for changing speeds. This keeps the display at a steady size. If the movement is too slow for the display to operate, the lights will be turned off. If no timing switch input occurs, the microprocessor is put to sleep.

There is usually not enough temporary storage in most microprocessors for large graphics or lots of display data. To solve this problem, the data can stored in an external memory or the microprocessor can be pre-programmed with only the data needed in the PROM section of the microprocessor. However, the end-user may not be able to change the display or have much temporary storage with the latter method.

When there is not enough 1/0, multiple microprocessors can be used. One microprocessor will be the supervisory processor which sends serial data each time it accesses the alphanumeric/graphics data. It is believed that this makes it easy since no data storage or timing algorithm is needed in the subordinate processors unless you are the oscillating the output to change the color of the LEDs. On programmable displays, this can be done in many ways. The displays that are self-powered (i.e., have a motor) can be seen because an operator inputs the data directly on the display. For displays that need to be moved by the operator to be seen (e.g., hand-held), the present device could have a serial port and be loaded from a PC or include push buttons with letters and a screen.

There are several choices for addressing this problem while keeping costs down for those non-self-powered displays. The operator can use one or two push buttons and the LEDs to count out alphanumeric characters. Another inexpensive choice is to incorporate a single alphanumeric LED parallel to the outputs of the display LEDs or lights. The common to the single alphanumeric LED could go through a power transistor so that the device would be enabled in the program mode. All the operator would have to do is scroll through each character and select in the proper order. Another simple and inexpensive choice is to have one infrared LED without a demodulation circuit. Without a demodulation circuit, the microprocessor would look at each time you hit the sensor with infrared light as pushing a button. This could eliminate push buttons altogether. To allow for one push button or infrared sensor programming, the operator would push the button repeatedly in a timely manner, and the LEDs would advance one time for each character and number. When the operator got to the alphanumeric character he or she wanted, he would pause and the LED could flash to give the signal to program the next character, space, or any other operational data needed. In the graphics programming mode, the operator should be required to layout how the lights (LEDs) are to look on piece paper, computer, etc. The operator would select each LED to be turned on in a row, then he would advance to the next row.

Turning the display on and off may only require moving the display in its normal operational path to activate the centrifugal, tilt, and/or reed switches, etc. Where direction is an issue, such as for a yo-yo or jump rope, there would be at least two sensors close together to detect the string or rope. To activate the sensors, the microprocessor would know which sensor is hit first because the delay would be greatest after the second sensor is activated. As discussed herein, this input information also could be used in keeping the timing.

The present display device does not require a lens which focuses light emitted from the LEDs. It does not require varying voltage levels for various LEDs. It does not require, and preferably does not include, slip rings.

In summary, this pre-programmed device for forming and displaying images, comprises:

(a) a plurality of electrically powered light emitters, preferably LEDs, in one or more generally continuous rows. The display device is capable of being moved in a path generally perpendicular with the row of lights. Some embodiments include multicolored LEDs, LEDs that change color, multiple colored lights, or spectral filters for color changes.

(b) one or more microprocessors. The light emitters are under the direct control of one or more microprocessors. The microprocessor turns the individual light emitters on and off in a time-controlled manner, in order that graphics, words or messages are displayed when the display device is moved at or above a rate of speed sufficient to be viewed by humans.

(c) one or more motion or speed sensors within the display device. They enable the microprocessor. Surprisingly, no on/off switch for the microprocessor is required.

(d) a source of electrical power within, on, or connected to the display device. Some embodiments include a power connector for connection to an outside power source. In some embodiments of the present invention, the power source is within the display device, and comprises a battery, a solar cell, an electrically induced power device, a drive motor field winding, or slip rings.

The display device preferably further comprises: (e) a printed circuit board, an electrical generator rectifying and regulating circuit within or on the display device, with a shaft mechanically linked with a gear or pulley and belt, or friction, or indirectly driven by a fan or impeller; (f) a means for focusing the light emitters to enable direct or indirect viewing of the graphics or word display on surfaces. Some embodiments comprise a manual lens or reflector adjustment mechanism for focusing light, and/or a manual reflector or light movement adjustment mechanism for adjusting the spread of the lights, and/or fiber optics or light pipes for transmitting light for the display from one point location to another.

The present display device may also comprise: (g) a switching device for timing, the switching device comprising a tilt switch, mercury switch, centrifugal switch, reed switch, mechanical switch, photo switch, proximity switch, wind speed sensor, air flow heating element dissipation sensor, or pick-off sensor. The display device may alternatively include a tilt or gravity-type switching device, comprising a reed switch, and a magnet enclosed in a nonmetallic chamber. The magnet is moveable within the nonmetallic chamber and being parallel to the reed switch. The switching device is preferably connected to a microprocessor pin to allow the display device to determine when it is in operation or what its position is.

The display device may comprise: (h) a mechanical switch, electronic or electrical component or circuit, light sensor device, or communications device for enabling the display device; (i) a means of programming, or visually indicating to a user what is being programmed through the use of a Personal Computer, Internet Service Provider (ISP) connection, portable computing device, pager interface, cell phone interface, infrared remote, radio frequency (RF) remote, push button, photo sensor, Light Emitting Diode, alphanumeric Light Emitting Diode, Liquid Crystal Display, or Digital Signal Processor for voice control and programming; and/or (j) a communication device to allow a user to configure and interface programming devices to the display, the communication device being a radio frequency (RF) device, ultrasonic device, infrared (IR) device, serial device (preferably that use RS 232, RS 485, or RS 422 communication standards), parallel device, USB, hard wire (direct wiring) device, digital signal processor (DSP) communication device, Internet Service Provider (ISP), or X-10 communication device. The latter is for data transmission across AC power lines when the alternating current is at 0 volts.

The display device may comprise: (k) a primary/secondary coil mechanism capable of transmitting data to a display that uses induced power to operate, the coil having a primary side and a secondary side; a means for modulating power from the primary side of the coil; and a means for collecting the data or timing on the secondary side of the coil before rectification to provide power for the display device; (l) a digital memory device connected by conductors to the microprocessor to allow data storage; and/or (m) an exterior housing, more preferably with a transparent, translucent, or opaque cover, spectral filters, or a one-way glass or plastic for viewing of the display. Some embodiments include a hinge along a middle portion of the display and a locking mechanism, such that the display device is foldable along the hinge into an open or a closed position. This way, the display device has an increased display length in the open position, and is protected when in the closed position. The device may include a handle with a swivel attachment for spinning the display, and/or a finger or hand guard to prevent an operator from blocking the display or from hitting moving portions.

The device may comprise (n) two or more microprocessor input/output pins on two sides of the display device and a proper algorithm for viewing the display from two sides and for maintaining legible graphics and alphanumeric characters. Surprisingly, a single input/output microprocessor pin may be used to drive a two-pin color light emitting diode in order to show four colors. Four colors are made by using a voltage divider and raising one of the LED pins to the voltage level of half of the maximum of the input/output (I/O) pin voltage level. When the I/O pin is made an output and lowered to 0 volts, the bias across the LED is one directional, which creates one of four colors. When the I/O pin is made high (puts out maximum voltage), the bias across the LED is the opposite and the second of the four colors is produced. By isolating the I/O pin on and off at different time lengths, at least two additional colors can be produced. When the I/O pin is made an input, the LED will not emit light because the I/O pin draws virtually no current.

The lights may not be mounted on the PC board, and the device may comprise (o) external conductors to energize the display lights to enable the lights to be mounted away from the microprocessor or to increase flexibility in the display; (p) a multiplexer, serial/parallel chip, or shift register linked to the microprocessor to increase the number of lights the microprocessor is able to control; (q) a flashlight comprising a bulb, lens and reflector, the flashlight being built into the display device; and/or (r) an analog or digital sound system.

The display device may comprise: a case wherein the display device is held in the user's hand, or is attached to a key chain; or a flexible rod with a handle for whipping the display back and forth. The present device can be: part of, or affixed to, an analog or digital wrist or pocket watch, the face of the watch having removal or rotating face movement for easy viewing and operation; installed in or on a sole or an upper of a shoe, or an article of clothing; installed in or on a pen, mechanical pencil, or light pen; built into or detachably affixed to a necklace, wrist or ankle band, or a child's toy; or installed in a motorized, non-motorized, or radio controlled toy car; built into, or installed in or on, a vehicle wheel, rim, hub cap, or spoke of a wheel; installed in a clear or translucent police traffic baton, or an airport traffic control baton; installed in a clear or translucent twirling baton, toy light-up sword, frisbee, flag pole, or a hoola hoop; installed in or on a fan, windmill, windspeed detector, paddlewheel, helicopter blade, or propeller; mounted inside or outside a side of a vehicle, a vehicle antenna, a vehicle top, an inside window of a vehicle, or in a magnetic sign on the vehicle; installed on the end of a windshield wiper motion arm; installed in an enclosure suitable for 360 degree viewing or three dimensional viewing with multiple layers of displays; or wherein the display itself also functions as an electric motor, and the display spins on a single axis; ergonomically shaped to fit inside on a user's head as in a hat or cap; or in the shape of a cylindrical tube with the lights mounted lengthwise for displaying the same data in correct order simultaneously on the front and rear of the cylindrical tube.

The present device may further comprise: one or more sensors linked to the microprocessor for indicating direction of movement of the display device; a yo-yo with one or more display surfaces to enable viewing from any angle; a jump rope with a clear or translucent flexible tube portion comprising the lights, and two handles comprising an electronic control circuit, a power source, or either two sensors or a directional selector switch with a single motion sensor; one or two flexible straps, each connected at one end to the display device for a user to hold while spining the display device; a clear or translucent flexible tube, and a handle, the lights being enclosed within the flexible tube, the handle being attached to one end of the flexible tube, the handle containing the power system and a majority of the other components; a swivel, hinge, bendable aperture or bendable display, mechanical mounting, or a ball and socket for the user to modify the viewing angle of the display; a magnet mounting, inverted or horizontal mounting hardware, floor mounting, hanging hardware, pole or pipe mounting hardware, weighted base mounting, or a screw type mounting; an electric motor, or engine for moving the display directly or indirectly; a stepper driver, DC drive, frequency drive, rheostat, or mechanical transmission for controlling the speed of the electric motor; a gear reduction mechanism, belt drive, hydraulic drive, or a friction drive for increasing the torque required to drive a display and slow the speed of the display down; a laser or ultrasonic distance detection device for determining the distance to surfaces to allow automatic focusing of lights; comprising an autofocus lens or reflector display for adjusting for different distances in the surfaces and automatically focusing the lights; a reflector or bulb linked to electrical mechanical means for adjusting the spread of lights when used in conjunction with the autofocus lens; a hidden camera inside a device (to observe customers in stores), or a TV tuner for TV video out to the display.

In some embodiments of the present device: an electric motor is used to rotate the display device on a single axis for moving display data on a single plane; or additionally on a second axis for also moving display data at a rotating angle; or additionally on a third axis for keeping the display data at the same height at which the second axis is pointing, while keeping the second axis stationary; the display is a part of a ceiling light or table lamp, or lamp shade; or the device is on a system of at least one belt or chain, each belt or chain system riding on at least two axis.

Also included herein is a method of forming and displaying images, comprising the steps of: repeatedly moving a display device along a path perpendicular to a row or rows of electrically lit light emitting diodes on the display device; actuating a centrifugal switch within the device; enabling a microprocessor within the device, starting a pre-programmed microprocessor lighting algorithm; sequentially firing light emitting diodes in a pre-programmed pattern, thereby causing the microprocessor to display portions of characters or graphics; and continuously updating timing by the sensor to keep the display device operating and proportional; whereby an image is formed and perceived by viewers, day or night. This method may also include the step of providing a sound as a function of the actuation of the diodes.

Preferred embodiments of the invention have been described using specific terms, but it will be apparent to those of ordinary skill in the art that various modifications may be made without departing from the spirit or scope of the invention. Such modifications are intended to be within the scope of the present invention as defined by the following claims. It is intended that the doctrine of equivalents be relied upon to determine the fair scope of these claims in connection with any other person's product which falls outside the literal wording of these claims, but which in reality does not materially depart from this invention.

What is claimed is:

1. A pre-programmed device for displaying images, comprising:
    (a) a plurality of electrically powered light emitters in one or more generally continuous rows, the display device being capable of being moved in a path generally perpendicular with the row of lights;
    (b) at least one microprocessor, the light emitters being under direct control of at least one microprocessor;
    (c) at least one motion or speed sensor within the display device; and
    (d) a source of electrical power within, on, or connected to the display device; and
    (e) at least one input/output microprocessor pin on the microprocessor;
    wherein at least one input/output microprocessor pin drives at least one multicolor light emitting diode; and
    wherein at least one of the sensors enables the microprocessor; and the microprocessor turns individual light emitters on and off in a time-controlled manner, in order that graphics, words or messages are displayed when the display device is moved at or above a rate of speed sufficient to be viewed by humans.

2. A display device according to claim 1, further comprising a mechanism for focusing the light emitters to enable direct or indirect viewing of the graphics or word display on surfaces; and without an on/off switch for the microprocessor.

3. A display device according to claim 2, wherein the device comprises a power connector for connection to an outside power source, and the light emitters are light emitting diodes.

4. A display device according to claim 2, wherein the display device further comprises a switching device for timing, the switching device comprising a tilt switch, mercury switch, centrifugal switch, reed switch, mechanical switch, photo switch, proximity switch, wind speed sensor, air flow heating element dissipation sensor, or pick-off sensor.

5. A display device according to claim 2, further comprising at least one sensor linked to the microprocessor for indicating direction of movement of the display device, and wherein the display device is rotatable.

6. A display device according to claim 5, further comprising a clear or translucent flexible tube, and a handle, the lights being enclosed within the flexible tube, the handle being attached to one end of the flexible tube, the handle containing the power system and a majority of the other components.

7. A display device according to claim 1, wherein the power source is within the display device, and comprises a solar cell, an electrically induced power device, or a drive motor field winding, or slip rings.

8. A display device according to claim 1, further comprising a printed circuit board, an electrical generator rectifying and regulating circuit within or on the display device which powers the display device, with a shaft mechanically linked with a gear or pulley and belt, or friction, or indirectly driven by a fan or impeller.

9. A display device according to claim 1, comprising a self-enclosed tilt or gravity-type switching device, the switching device comprising a reed switch or Hall effects sensor, and a magnet enclosed in a nonmetallic chamber, the magnet being movable within the nonmetallic chamber and being parallel to the reed switch.

10. A display device according to claim 9, wherein the switching device is connected to the microprocessor pin and is adapted to allow the display device to determine when it is in operation or what its position is.

11. A display device according to claim 10, further comprising a mechanical switch, light sensor device, or communications device for enabling the display device.

12. A display device according to claim 11, further comprising a means of programming, or visually indicating to a user what is being programmed through the use of a Personal Computer, Internet Service Provider (ISP) connection, portable computing device, pager interface, cell phone interface, infrared remote, radio frequency (RF) remote, push button, photo sensor, Light Emitting Diode, alphanumeric Light Emitting Diode, Liquid Crystal Display, or Digital Signal Processor for voice control and programming.

13. A display device according to claim 12, further comprising a communication device to allow a user to configure and interface programming devices to the display, the communication device being a radio frequency device, ultrasonic device, infrared device, serial device, parallel device, USB, hard wire device, Digital Signal Processor communication device, Internet Service Provider, or X-10 communication device.

14. A display device according to claim 12, further comprising a digital memory device connected by conductors to the microprocessor to allow data storage.

15. A display device according to claim 1, further comprising a plurality of multicolored light emitting diodes that can change color, multiple colored lights, or spectral filters for color changes.

16. A display device according to claim 15, further comprising a manual lens or reflector adjustment mechanism for focusing light.

17. A display device according to claim 16, further comprising a manual reflector or light movement adjustment mechanism adapted for a user to adjust the spread of the lights.

18. A display device according to claim 17, further comprising a flashlight comprising a bulb, lens and reflector, the flashlight being built into the display device; or voice chip system.

19. A display device according to claim 16, further comprising light pipes for transmitting light for the display from one point location to another.

20. A display device according to claim 15, wherein the lights are not mounted on the PC board, and further comprising external conductors to energize the display lights to enable the lights to be away from the microprocessor or to increase flexibility in the display.

21. A display device according to claim 15, further comprising a single input/output microprocessor pin capable of showing four colors by driving a two-pin color light emitting diode.

22. A display device according to claim 15, further comprising a swivel, hinge, bendable aperture or bendable display, mechanical mounting, or a ball and socket for the user to modify the viewing angle of the display.

23. A display device according to claim 22, further comprising a magnet mounting, inverted or horizontal mounting hardware, floor mounting, hanging hardware, pole or pipe mounting hardware, weighted base mounting, or a screw type mounting.

24. A display device according to claim 1, further comprising an exterior housing having an entirely transparent, translucent, or opaque cover, spectral filters, or a one-way glass or plastic for viewing of the display.

25. A display device according to claim 24, further comprising a handle with a swivel attachment for spinning the display.

26. A display device according to claim 25, further comprising a flexible rod with a handle for whipping the display back and forth.

27. A display device according to claim 24, further comprising a finger or hand guard to prevent an operator from blocking the display or from hitting moving portions.

28. A display device according to claim 27, further comprising a case wherein the display device is attachable to a key chain and hand-held.

29. A display device according to claim 1, further comprising a multiplexer, serial/parallel chip, or shift register linked to the microprocessor to increase the number of lights the microprocessor is able to control; wherein display data comes from the microprocessor I/O pin.

30. A pre-programmed device for displaying images, comprising:
    (a) a plurality of electrically powered light emitters in one or more generally continuous rows, the display device being capable of being moved in a path generally perpendicular with the row of lights; the light emitters comprising a plurality of multicolored light emitting diodes, light emitting diodes that change color, multiple colored lights or spectral filters for color changes;
    (b) one or more microprocessors, the light emitters being under direct control of at least one of the microprocessors;
    (c) at least one motion or speed sensor within the display device; and
    (d) an electric motor or engine for moving the display directly or indirectly;
    wherein at least one sensor enables the microprocessor; and the microprocessor turns the individual light emitters on and off in a time-controlled manner, in order that graphics, words or messages are displayed when the display device is moved at or above a rate of speed sufficient to be viewed by humans.

31. A display device according to claim 30, further comprising a stepper driver, DC drive, frequency drive, rheostat, or mechanical transmission for controlling the speed of the electric motor.

32. A display device according to claim 31, further comprising a gear reduction mechanism, belt drive, hydraulic drive, or a friction drive for increasing the torque required to drive a display and slow the speed of the display down.

33. A display device according to claim 32, further comprising a laser or ultrasonic distance detection device for determining the distance to surfaces to allow automatic focusing of lights.

34. A display device according to claim 33, further comprising an autofocus lens or reflector display for adjusting for different distances in the surfaces and automatically focusing the lights.

35. A display device according to claim 34, further comprising a reflector or bulb linked to electrical mechanical means for adjusting the spread of lights when used in conjunction with the autofocus lens.

36. A display device according to claim 34, further comprising a hidden camera inside the display device, or a TV tuner for TV video out to the display; or wherein the display device is installed on the end of a windshield wiper motion arm.

37. A display device according to claim 30, ergonomically shaped to fit inside on a user's head as in a hat or cap; or in the shape of a cylindrical tube with the lights mounted lengthwise for displaying the same data in correct order simultaneously on the front and rear of the cylindrical tube.

38. A display device according to claim 30, wherein the electric motor is used to rotate the display device on a single axis for moving display data on a single plane; or additionally on a second axis for also moving display data at a rotating angle; or additionally on a third axis for keeping the display data at the same height at which the second axis is pointing, while keeping the second axis stationary.

39. A display device according to claim 30, wherein the display is a part of a ceiling light or table lamp, or lamp shade; or wherein at least one display device is on a system of at least one belt or chain, each belt or chain system riding on at least two axis.

* * * * *